United States Patent
Nomura

(10) Patent No.: US 10,719,556 B2
(45) Date of Patent: Jul. 21, 2020

(54) INFORMATION PROCESSING APPARATUS AND COMPUTER-READABLE STORAGE MEDIUM STORING INFORMATION PROCESSING PROGRAM

(71) Applicant: FUJITSU LIMITED, Kawasaki-shi, Kanagawa (JP)

(72) Inventor: Yuji Nomura, Nagoya (JP)

(73) Assignee: FUJITSU LIMITED, Kawasaki (JP)

( * ) Notice: Subject to any disclaimer, the term of this patent is extended or adjusted under 35 U.S.C. 154(b) by 135 days.

(21) Appl. No.: 16/172,909

(22) Filed: Oct. 29, 2018

(65) Prior Publication Data

US 2019/0155960 A1 May 23, 2019

(30) Foreign Application Priority Data

Nov. 20, 2017 (JP) ................................ 2017-222952

(51) Int. Cl.
  *G06F 16/00* (2019.01)
  *G06F 16/901* (2019.01)
  (Continued)

(52) U.S. Cl.
  CPC ...... *G06F 16/9017* (2019.01); *G06F 12/0868* (2013.01); *G06F 16/1748* (2019.01);
  (Continued)

(58) Field of Classification Search
  CPC ............. G06F 11/1453; G06F 11/1464; G06F 12/0868; G06F 16/119; G06F 16/1748;
  (Continued)

(56) References Cited

U.S. PATENT DOCUMENTS

| 5,496,689 A | 3/1996 | Ogawa |
| 5,889,935 A * | 3/1999 | Ofek .................. G06F 11/2066 709/217 |

(Continued)

FOREIGN PATENT DOCUMENTS

| JP | 2008-515120 | 5/2008 |
| JP | 2012-141738 | 7/2012 |

(Continued)

OTHER PUBLICATIONS

Extended European Search Report dated Dec. 13, 2018 for corresponding European Patent Application No. 18203350.6, 8 pages.

(Continued)

*Primary Examiner* — Merilyn P Nguyen
(74) *Attorney, Agent, or Firm* — Fujitsu Patent Center

(57) ABSTRACT

When a control unit performs a first operation on a data group, the control unit registers operation information corresponding to the data group in transfer control information. When the control unit extracts the data group as a transfer target, the control unit temporarily stores the corresponding operation information as stored information and transfers the data group to a storage apparatus. When the control unit performs a second operation on the data group while the data group is being transferred, the control unit updates the operation information registered in the transfer control information. When the transfer of the data group is completed, the control unit compares the operation information registered in the transfer control information with the stored information. If these items of information do not match, the control unit retransfers the data group to the storage apparatus.

15 Claims, 27 Drawing Sheets

(51) Int. Cl.
*G06F 12/0868* (2016.01)
*G06F 16/174* (2019.01)
*G06F 16/182* (2019.01)
*G06F 16/21* (2019.01)
*G06F 16/23* (2019.01)

(52) U.S. Cl.
CPC ........ *G06F 16/1827* (2019.01); *G06F 16/214* (2019.01); *G06F 16/23* (2019.01)

(58) Field of Classification Search
CPC .... G06F 16/1752; G06F 16/214; G06F 16/23; G06F 16/2379; G06F 3/0647; G06F 3/067
See application file for complete search history.

(56) References Cited

U.S. PATENT DOCUMENTS

| | | | |
|---|---|---|---|
| 7,546,482 B2* | 6/2009 | Blumenau | G06F 11/1435 710/15 |
| 8,898,394 B2 | 11/2014 | Kondo et al. | |
| 10,242,012 B1* | 3/2019 | Basov | G06F 3/065 |
| 2007/0276765 A1* | 11/2007 | Hazel | G06K 7/082 705/71 |
| 2008/0183774 A1 | 7/2008 | Otani et al. | |
| 2011/0286123 A1 | 11/2011 | Montgomery | |
| 2013/0268499 A1 | 10/2013 | Kirihata et al. | |
| 2014/0006354 A1* | 1/2014 | Parkison | G06F 3/067 707/649 |
| 2014/0006465 A1* | 1/2014 | Davis | G06F 16/183 707/827 |
| 2014/0310462 A1* | 10/2014 | Waldspurger | G06F 17/40 711/118 |
| 2016/0063050 A1 | 3/2016 | Schoen et al. | |
| 2017/0242599 A1* | 8/2017 | Patnaik | G06F 11/1662 |
| 2018/0329825 A1* | 11/2018 | Agombar | G06F 12/0871 |

FOREIGN PATENT DOCUMENTS

| | | |
|---|---|---|
| JP | 2014-529111 | 10/2014 |
| WO | 2006/039689 | 4/2006 |
| WO | 2013/003713 | 1/2013 |

OTHER PUBLICATIONS

European Patent Office dated Feb. 7, 2020 for corresponding European Patent Application No. 18203350.6, 10 pages.

* cited by examiner

111 DIRECTORY TABLE

| parent | name | ino | |
|--------|------|-----|---|
| 0 | – | 1 | ~111a |
| 1 | A | 2 | ~111b |
| 1 | B | 4 | ~111c |
| 2 | X | 3 | ~111d |
| 4 | C | 5 | ~111e |
| 5 | Y | 6 | ~111f |
| 5 | Z | 7 | ~111g |
| ... | ... | ... | |

FIG. 6

112 ENTRY TABLE

| ino | mode | nlink | uid | gid | size | atime | mtime | ctime |
|---|---|---|---|---|---|---|---|---|
| i1 | m1 | n1 | u1 | g1 | s1 | a1 | t1 | c1 |
| i2 | m2 | n2 | u2 | g2 | s2 | a2 | t2 | c2 |
| i3 | m3 | n3 | u3 | g3 | s3 | a3 | t3 | c3 |
| ... | ... | ... | ... | ... | ... | ... | ... | ... |

FIG. 7

113 CHUNK MAP TABLE

| ino | offset | size | gno | gindex |
|-----|--------|------|-----|--------|
| i1  | o11    | s11  | g1  | x1     |
| i1  | o12    | s12  | g1  | x2     |
| i2  | o21    | s21  | g1  | x3     |
| i2  | o22    | s22  | g1  | x4     |
| i2  | o23    | s23  | g2  | x1     |
| i2  | o24    | s24  | g2  | x2     |
| ... | ...    | ...  | ... | ...    |

FIG. 8

114 CHUNK TABLE

| hash | size | refcnt | gno | gindex |
|---|---|---|---|---|
| h1 | s1 | 1 | g1 | x1 |
| h2 | s2 | 2 | g2 | x2 |
| h3 | s3 | 3 | g3 | x3 |
| h4 | s4 | 1 | g4 | x4 |
| ... | ... | ... | ... | ... |

FIG. 9

115 CHUNK GROUP TABLE

| gno | gindex | data |
|-----|--------|------|
| g1  | x1     | d1   |
| g1  | x2     | d2   |
| g1  | x3     | d3   |
| g1  | x4     | d4   |
| g2  | x1     | d5   |
| g2  | x2     | d6   |
| ... | ...    | ...  |

FIG. 11A

141 FILE OBJECT

| OBJECT NAME | parent |
| | name |
| OBJECT VALUE | ino |
| | mode |
| | nlink |
| | uid |
| | gid |
| | size |
| | atime |
| | mtime |
| | ctime |

FIG. 11B

142 CHUNK MAP OBJECT

| OBJECT NAME | ino |
| OBJECT VALUE | offset |
| | size |
| | hash |
| | gno |
| | gindex |

FIG. 15

121 OPERATION LOG TABLE

| counter | type | ino | gno | action | update |
|---|---|---|---|---|---|
| c1 | FILE OPERATION | i1 | - | FILE CREATED | 2 | 121-1
| c2 | DATA OPERATION | - | g1 | DATA WRITTEN | 2 | 121-2
| c3 | FILE OPERATION | i2 | - | FILE BEING CREATED | 1 | 121-3
| c4 | DATA OPERATION | - | g2 | DATA BEING WRITTEN | 1 | 121-4
| ... | ... | ... | ... | ... | ... |

INFORMATION PROCESSING APPARATUS AND COMPUTER-READABLE STORAGE MEDIUM STORING INFORMATION PROCESSING PROGRAM

CROSS-REFERENCE TO RELATED APPLICATION

This application is based upon and claims the benefit of priority of the prior Japanese Patent Application No. 2017-222952, filed on Nov. 20, 2017, the entire contents of which are incorporated herein by reference.

FIELD

The embodiments discussed herein relate to an information processing apparatus and a computer-readable storage medium storing an information processing program.

BACKGROUND

Storage services providing storage areas via a network have been in widespread use, and examples of these services include online storage services and cloud storage services. In addition, there are storage gateways serving as gateways between these storage services and computers of their customers.

For example, a cloud storage gateway relays write data between a cloud storage system and a computer of its customer. As a more specific example, a cloud storage gateway receives write data per file from a computer of a customer and a write request for the write data and transfers the write data per object to a cloud storage.

In addition, as an example of the related technique, there has been proposed a file server that stores data on an online storage. In the case of this file server, a database for holding configurations about blocks obtained by dividing a file, a database for holding file configurations, and a database for holding meta-information are each divided into a plurality of partitioned databases, and information in any one of the above databases is uploaded to an online storage per partitioned database. In addition, an entry in each partitioned database includes a Dirty flag indicating whether the corresponding content has been updated, and whether a content in any one of the partitioned databases needs to be uploaded to the online storage is determined based on the corresponding Dirty flag.

See, for example, Japanese National Publication of International Patent Application No. 2014-529111 and Japanese Laid-open Patent Publication No. 2012-141738.

The above storage gateway temporarily stores data to be transferred to a storage service in a local storage and extracts data that needs to be transferred from the data stored in the local storage. In this processing, there are cases in which the processing for storing data in the local storage and the processing for extracting data that needs to be transferred from the local storage and transferring the data are performed asynchronously.

In the case of this kind of storage gateway, it is important that the data that needs to be transferred be efficiently and accurately extracted from the data stored in the local storage. For example, one method of efficiently extracting the data that needs to be transferred is storing a flag such as the above Dirty flag, which indicates whether data has been updated, per data group used as a unit for data transfer to an external storage. However, with this method, while a data group is being transferred to a storage service based on the corresponding flag, if the original data group in the local storage is updated, the processing module that performs the transfer processing is unable to recognize the occurrence of the update. Thus, the update content of the data group could not be reflected accurately on the storage service.

This problem could arise not only in storage gateways but also in information processing apparatuses that transfer stored data to external storage apparatuses.

SUMMARY

According to one aspect, there is provided an information processing apparatus including: a memory that holds a plurality of data groups each of which has been classified as a unit of data transfer to an external storage apparatus and transfer control information in which at least one item of operation information each corresponding to any one of the plurality of data groups is registered; and a processor that executes a process including: registering, when performing a first operation on a first data group of the plurality of data groups, first operation information corresponding to the first data group in the transfer control information, temporarily storing, when extracting the first data group as a transfer target, the first operation information corresponding to the first data group as stored information and transferring the first data group to the external storage apparatus, updating, when performing a second operation on the first data group while transferring the first data group to the external storage apparatus, the first operation information registered in the transfer control information, comparing, when completing the transferring of the first data group to the external storage apparatus, the first operation information registered in the transfer control information with the stored information, and retransferring, when the first operation information and the stored information do not match, the first data group corresponding to the first operation information to the external storage apparatus.

The object and advantages of the invention will be realized and attained by means of the elements and combinations particularly pointed out in the claims.

It is to be understood that both the foregoing general description and the following detailed description are exemplary and explanatory and are not restrictive of the invention.

BRIEF DESCRIPTION OF DRAWINGS

FIG. 6 illustrates a data configuration example of an entry table;

FIG. 7 illustrates a data configuration example of a chunk map table;

FIG. 8 illustrates a data configuration example of a chunk table;

FIG. 9 illustrates a data configuration example of a chunk group table;

FIGS. 11A and 11B illustrate data configuration examples of a file object and a chunk map object;

FIG. 15 illustrates a data configuration example of an operation log table;

DESCRIPTION OF EMBODIMENTS

Figure 1:
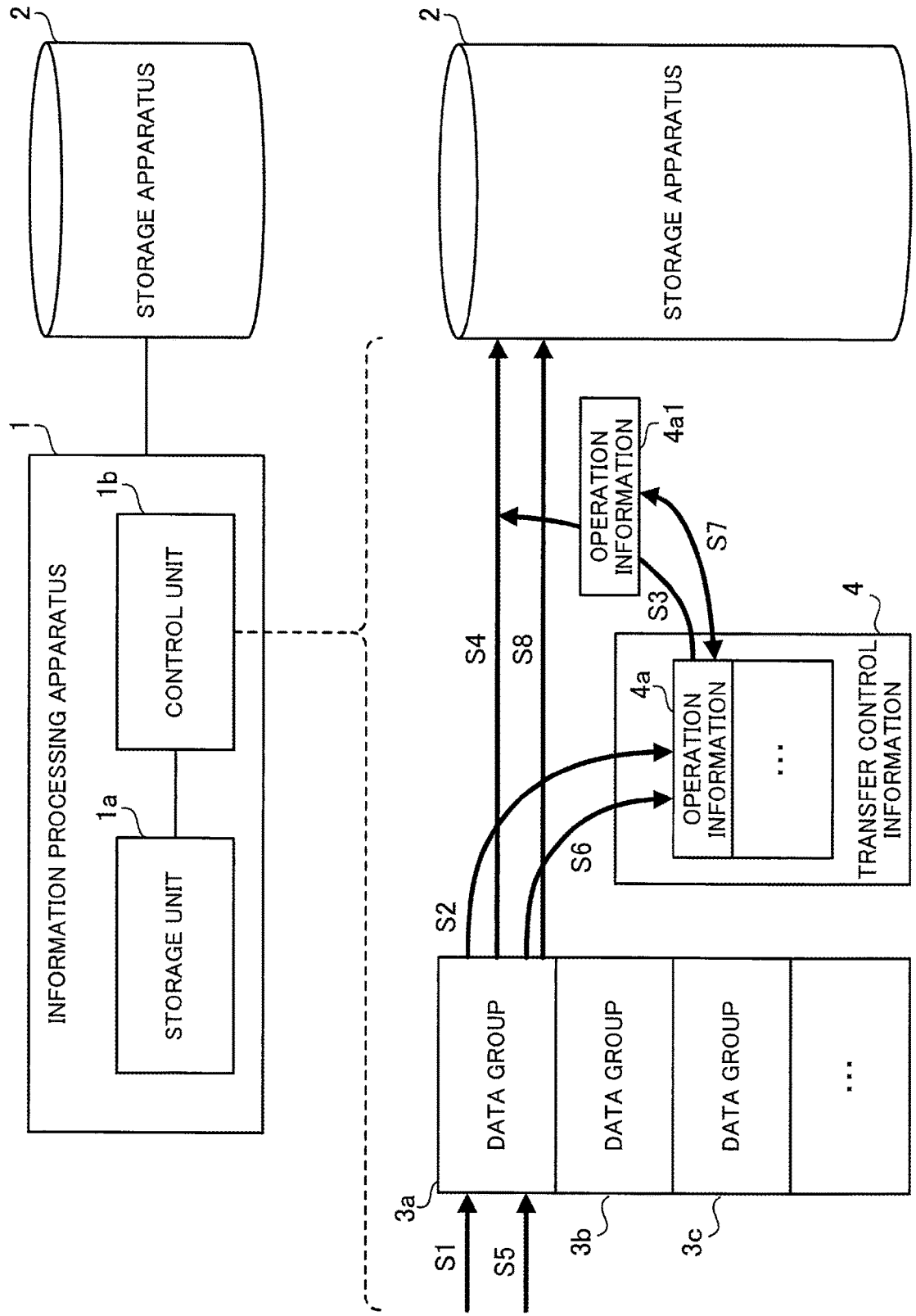
FIG. 1 illustrates a configuration example and a processing example of an information processing system according to a first embodiment.

Embodiments will be described below with reference to the accompanying drawings, wherein like reference characters refer to like elements throughout.

First Embodiment

FIG. 1 illustrates a configuration example and a processing example of an information processing system according to a first embodiment. The information processing system illustrated in FIG. 1 includes an information processing apparatus 1 and a storage apparatus 2 externally connected thereto.

The storage apparatus 2 holds data transferred from the information processing apparatus 1. A storage area in the storage apparatus 2 may be realized by a single storage device or a plurality of storage devices.

The information processing apparatus 1 includes a storage unit 1a and a control unit 1b. The storage unit 1a is realized by a storage area of a storage device included in the information processing apparatus 1, such as a random access memory (RAM) or a hard disk drive (HDD). The control unit 1b is realized, for example, as a processor included in the information processing apparatus 1.

The storage unit 1a holds data to be transferred to the storage apparatus 2, and the data has been classified as data groups 3a, 3b, 3c, and so on, each of which is a unit of data transferred to the storage apparatus 2. The storage unit 1a also holds transfer control information 4 in which at least one item of operation information each corresponding to any one of the data groups 3a, 3b, 3c, and so on is registered.

When the control unit 1b performs an operation on a certain data group, the control unit 1b registers operation information corresponding to this data group in the transfer control information 4. In addition, the control unit 1b acquires operation information from the transfer control information 4 and transfers a data group corresponding to the acquired operation information to the storage apparatus 2. In this way, the control unit 1b is able to operate data groups and transfer the data groups to the storage apparatus 2 asynchronously. In addition, the control unit 1b is able to determine data groups that need to be transferred to the storage apparatus 2 by acquiring operation information registered in the transfer control information 4. The control unit 1b acquires the operation information from the transfer control information 4 in the order in which the operation information has been registered.

Hereinafter, a specific example of processing performed by the control unit 1b will be described.

First, the following description assumes that the control unit 1b performs a first operation on the data group 3a (step S1). Next, the control unit 1b registers operation information 4a corresponding to the data group 3a, which is the operation target, in the transfer control information 4 (step S2). This first operation may be an operation of updating at least a part of the data included in the data group 3a or an operation of newly storing the data group 3a itself in the storage unit 1a, for example.

Next, when the control unit 1b extracts the data group 3a as a transfer target, the control unit 1b acquires the operation information 4a corresponding to the data group 3a from the transfer control information 4 and temporarily stores the acquired operation information 4a in a temporary storage area in the storage unit 1a (step S3). Herein, the stored operation information 4a will be expressed as "operation information 4a1", to be distinguished from the operation information 4a registered in the transfer control information 4. Next, the control unit 1b transfers the data group 3a corresponding to the acquired operation information 4a to the storage apparatus 2 (step S4).

The following description assumes that the control unit 1b performs a second operation on the data group 3a while transferring the data group 3a to the storage apparatus 2 (step S5). In this case, the control unit 1b updates the operation information 4a, which is registered in the transfer control information 4 and corresponds to the data group 3a, which is the operation target (step S6).

In addition, when the control unit 1b completes the transfer of the data group 3a to the storage apparatus 2, the control unit 1b compares the operation information 4a registered in the transfer control information 4 at this point with the stored operation information 4a1 (step S7). If the operation information 4a and the operation information 4a1 match, the control unit 1b determines that the data group 3a has not been updated and ends the data transfer processing. In this case, for example, the control unit 1b removes the operation information 4a from the transfer control information 4. However, if the operation information 4a and the operation information 4a1 do not match, the control unit 1b determines that the data group 3a has been updated and retransfers the data group 3a to the storage apparatus 2 (step S8).

As described above, when the control unit 1b performs an operation on a certain data group while transferring this data group to the storage apparatus 2, the control unit 1b updates the operation information, which is registered in the transfer control information 4 and corresponds to the data group. In addition, when the control unit 1b completes the transfer of the data group to the storage apparatus 2, the control unit 1b acquires the operation information from the transfer control information 4 again and compares the acquired operation information with the operation information stored before the transfer. By performing this comparison, the control unit 1b determines whether the data group has been updated during the transfer of the data group. In addition, when the above two kinds of operation information do not match, the control unit 1b determines that the data group has been updated and retransfers the data group to the storage apparatus 2. In this way, even when a data group is updated while being transferred, the control unit 1b is able to reflect the update content of the data group on the storage apparatus 2 without fail.

Second Embodiment

Figure 2:
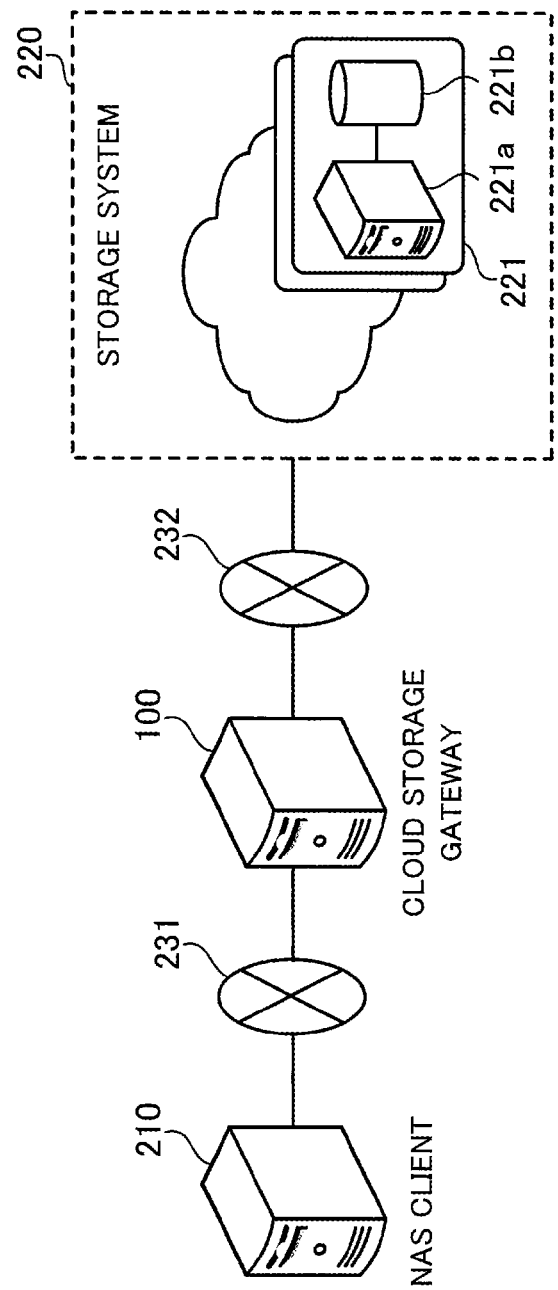
FIG. 2 illustrates a configuration example of an information processing system according to a second embodiment.

FIG. 2 illustrates a configuration example of an information processing system according to a second embodiment. The information processing system illustrated in FIG. 2 includes a cloud storage gateway 100, a network-attached storage (NAS) client 210, and a storage system 220. The cloud storage gateway 100 is connected to the NAS client 210 via a network 231 and is connected to the storage system 220 via a network 232. These networks are, for example, local area networks (LANs) or wide area networks (WANs).

The storage system 220 provides a cloud storage service via the network 232. In the following description, a storage area made usable by a service user (the cloud storage gateway 100 in FIG. 2) by using the cloud storage service provided by the storage system 220 will be referred to as a "cloud storage", as needed.

In addition, in the present embodiment, as an example, the storage system 220 is realized by an object storage in which data is managed per object. For example, the storage system 220 is realized by a distributed storage system including a plurality of storage nodes 221, each of which includes a control server 221a and a storage apparatus 221b. In this case, in an individual storage node 221, the corresponding control server 221a controls access to the corresponding storage apparatus 221b, and a part of the cloud storages is realized by a storage area in the storage apparatus 221b. In addition, when the service user (the cloud storage gateway 100) stores an object in a storage node 221, this storage node 221 is determined based on information unique to the object.

The NAS client 210 recognizes the cloud storage gateway 100 as a NAS server that provides a storage area managed by a file system. The storage area is a storage area based on a cloud storage provided by the storage system 220. The NAS client 210 requests the cloud storage gateway 100 to read or write data per file in accordance with the Network File System (NFS) protocol or the Common Internet File System (CIFS) protocol, for example. Namely, a NAS server function of the cloud storage gateway 100 allows the NAS client 210 to use an individual cloud storage as a large-capacity virtual network file system.

For example, the NAS client 210 performs backup software for data backup. Consequently, the NAS client 210 stores a file stored therein or a file stored in a server (for example, a business server) connected to the NAS client 210 in a storage area provided by the NAS server.

The cloud storage gateway 100 is an example of the information processing apparatus 1 illustrated in FIG. 1. The cloud storage gateway 100 relays data transferred between the NAS client 210 and a cloud storage. For example, by using the NAS server function, the cloud storage gateway 100 receives a request for writing a file from the NAS client 210 and caches the file requested to be written therein. Next, the cloud storage gateway 100 divides this file into chunks and stores the chunks in a cloud storage. In this case, a plurality of chunks whose total size exceeds a certain size are grouped as a "chunk group", and an individual chunk group is transferred to the cloud storage as an object.

In addition, when caching a file, the cloud storage gateway 100 divides the file into chunks and performs "deduplication" so that chunks having the same content are not stored redundantly. In addition, the data of the chunks obtained by the division is stored after having been compressed. For example, in the cloud storage service, there are cases in which users are charged for the amount of data stored. By performing the deduplication and data compression, the amount of data stored in the cloud storage is reduced, and as a result, the charge for use of the service is reduced.

Figure 3:
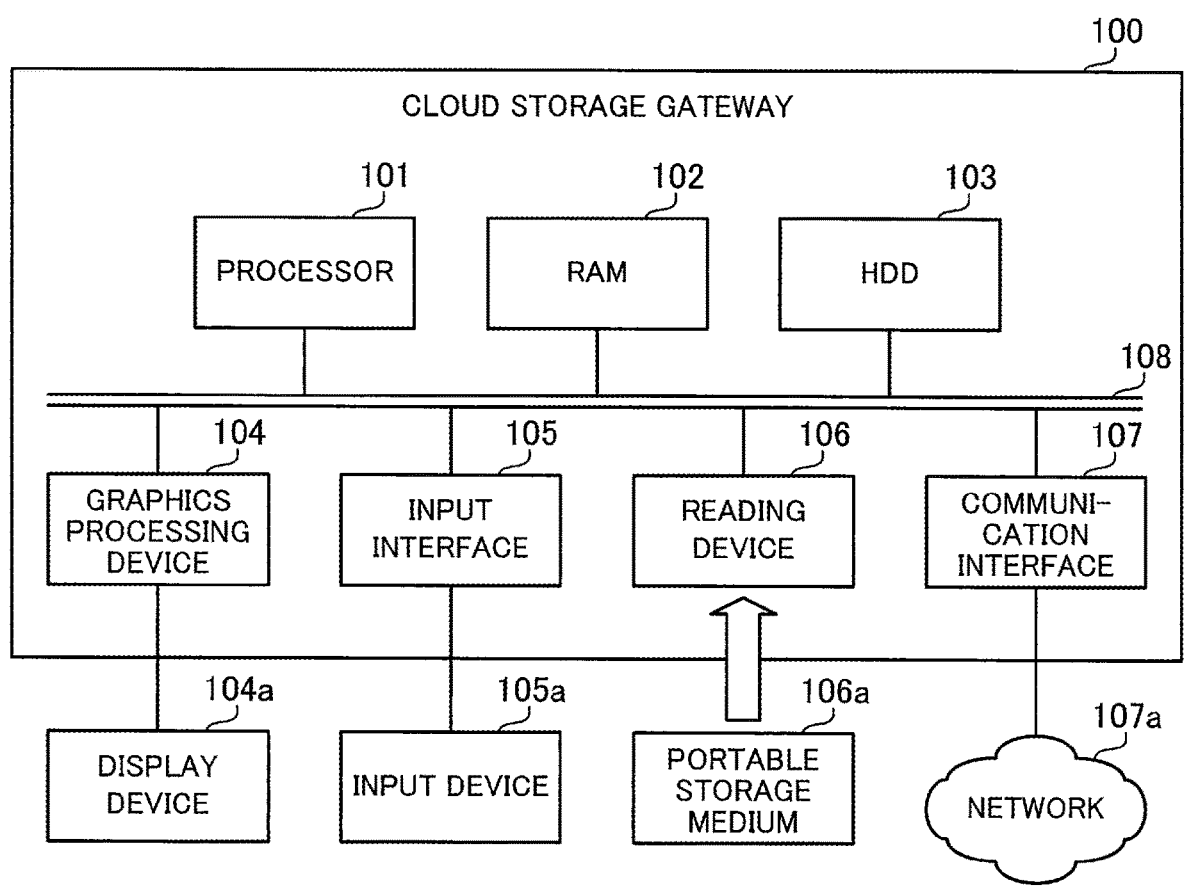
FIG. 3 is a block diagram illustrating a hardware configuration example of a cloud storage gateway.

FIG. 3 is a block diagram illustrating a hardware configuration example of the cloud storage gateway. The cloud storage gateway 100 is realized, for example, as a computer as illustrated in FIG. 3.

The cloud storage gateway 100 is comprehensively controlled by a processor 101. For example, the processor 101 is a central processing unit (CPU), a micro processing unit (MPU), a digital signal processor (DSP), an application specific integrated circuit (ASIC), or a programmable logic device (PLD). Alternatively, the processor 101 may be a combination of at least two of a CPU, an MPU, a DSP, an ASIC, and a PLD.

The processor 101 is connected to a RAM 102 and a plurality of peripheral devices via a bus 108.

The RAM 102 is used as a main storage device of the cloud storage gateway 100. The RAM 102 temporarily holds at least a part of an operating system (OS) program or an application program executed by the processor 101. In addition, the RAM 102 holds various kinds of data that is needed for processing performed by the processor 101.

Examples of the peripheral devices connected to the bus 108 include an HDD 103, a graphics processing device 104, an input interface 105, a reading device 106, and a communication interface 107.

The HDD 103 is used as an auxiliary storage device of the cloud storage gateway 100. The HDD 103 holds an OS program, an application program, and various kinds of data. As the auxiliary storage device, a different kind of non-volatile storage device such as a solid state drive (SSD) may be used.

The graphics processing device 104 is connected to a display device 104a and displays images on the display device 104a in accordance with instructions from the processor 101. Examples of the display apparatus include a liquid crystal display and an organic electroluminescence (EL) display.

The input interface 105 is connected to an input device 105a and transmits signals outputted from the input device 105a to the processor 101. Examples of the input device 105a include a keyboard and a pointing device. Examples of the pointing device include a mouse, a touch panel, a tablet, a touch pad, and a track ball.

A portable storage medium 106a is attachable to and detachable from the reading device 106. The reading device 106 reads data stored in the portable storage medium 106a and transmits the read data to the processor 101. Examples of the portable storage medium 106a include an optical disc, a magneto-optical disk, and a semiconductor memory.

The communication interface 107 exchanges data with other apparatuses via a network 107a.

The processing functions of the cloud storage gateway 100 are realized by the above hardware configuration. The NAS client 210 and the control server 221a may each be realized as a computer having a hardware configuration equivalent to that illustrated in FIG. 3.

Figure 4:
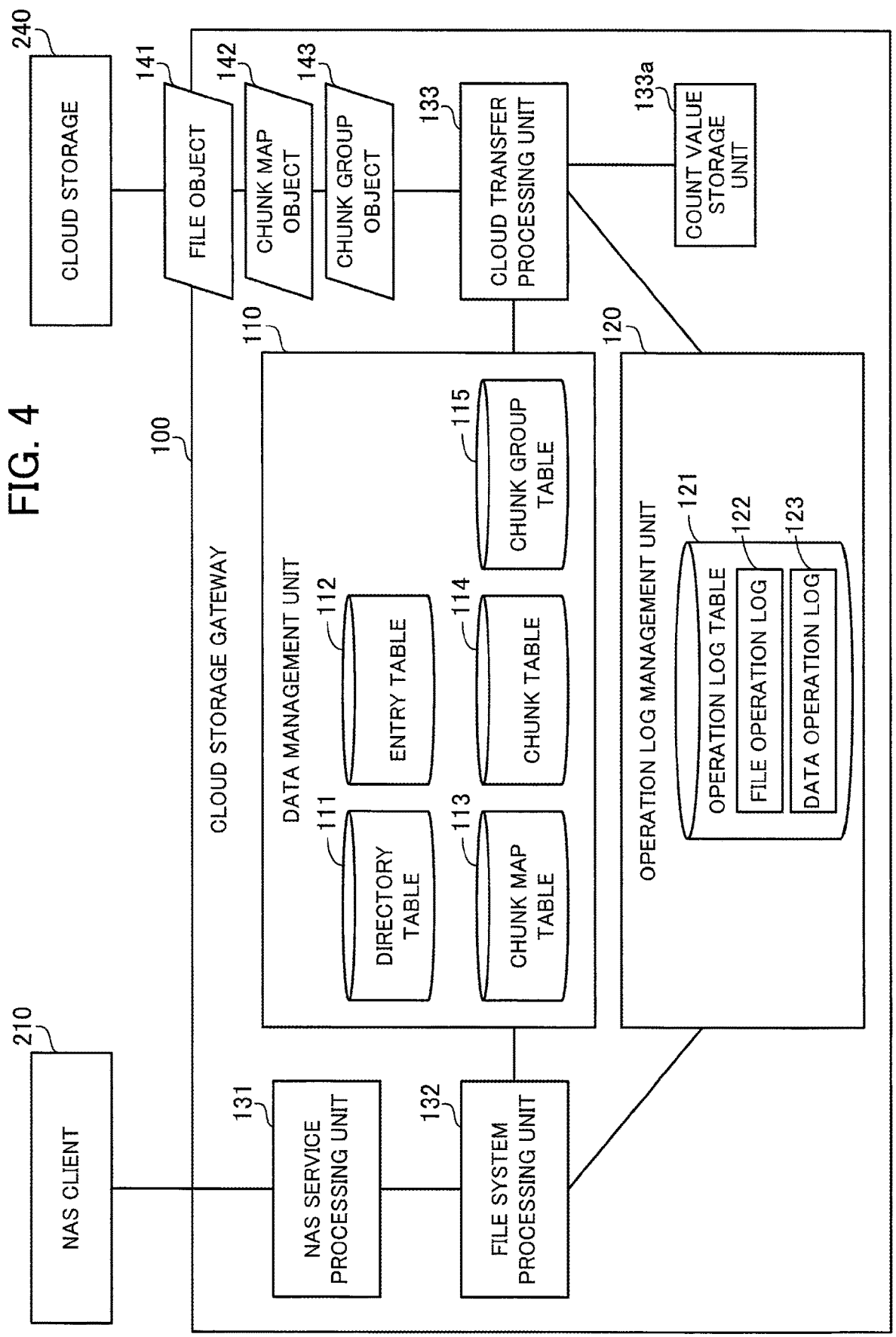
FIG. 4 is a block diagram illustrating a configuration example of processing functions of the cloud storage gateway.

FIG. 4 is a block diagram illustrating a configuration example of processing functions of the cloud storage gateway. The cloud storage gateway 100 includes a data management unit 110, an operation log management unit 120, a NAS service processing unit 131, a file system processing unit 132, and a cloud transfer processing unit 133.

The data management unit 110 and the operation log management unit 120 are realized by, for example, storage areas of a storage device of the cloud storage gateway 100, such as the RAM 102 or the HDD 103. In addition, for example, the processor 101 executes a predetermined program to realize processing performed by the NAS service processing unit 131, the file system processing unit 132, and the cloud transfer processing unit 133.

The NAS service processing unit 131 performs interface processing as a NAS server. Namely, the NAS service processing unit 131 receives a request for reading, writing, or removing a file from the NAS client 210 and transfers the requested content to the file system processing unit 132. In addition, the NAS service processing unit 131 responds to the NAS client 210 based on a result of processing performed by the file system processing unit 132.

The file system processing unit 132 performs processing based on a request from the NAS client 210 while accessing the data management unit 110 and the operation log management unit 120. For example, when writing of a new file is requested, the file system processing unit 132 divides the actual data of the file into chunks and stores the actual data obtained by the division in the data management unit 110 while performing deduplication. In this processing, the file system processing unit 132 also registers file information other than the actual data in the data management unit 110. In addition, the file system processing unit 132 registers the logs of operations about the file and chunks performed step by step until the file write processing is completed in the operation log management unit 120.

The data management unit 110 holds management information about files and the actual data included therein, such as the directory information about the files on the file system and information indicating relationships among the files, chunks, and chunk groups. In contrast, the operation log management unit 120 holds operation logs referred to by the cloud transfer processing unit 133 to determine the objects that need to be transferred to the cloud storage 240.

Next, information stored in the data management unit 110 will be described. The data management unit 110 holds a directory table 111, an entry table 112, a chunk map table 113, a chunk table 114, and a chunk group table 115. Among these tables, the directory table 111 and the entry table 112 holds information about the directory structure on the file system. The chunk map table 113, the chunk table 114, and the chunk group table 115 hold information about the chunks.

Figures 5A, 5B:
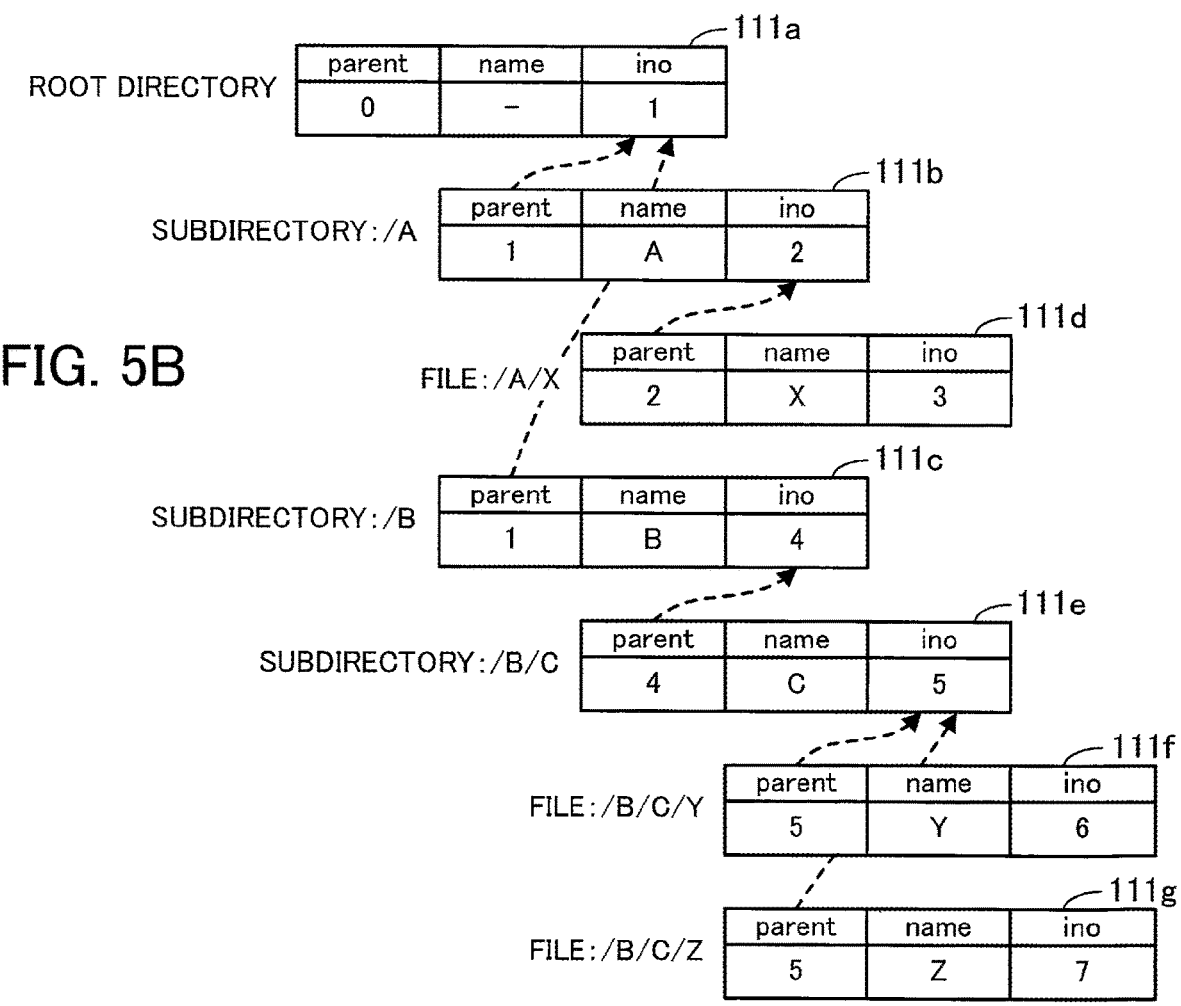
FIGS. 5A and 5B illustrate a directory table.

FIGS. 5A and 5B illustrate the directory table. FIG. 5A illustrates a data configuration example in the directory table 111, and FIG. 5B illustrates a directory structure example.

The directory table 111 holds management information for expressing the hierarchical structure of the directories. As illustrated in FIG. 5A, the directory table 111 holds records each including items "parent", "name", and "ino". Each record is associated with a single directory (a folder) on the directory structure or a single file in a directory. The item "parent" in a record indicates the inode number of the corresponding parent directory, and the item "name" indicates the name of the corresponding directory or file. The item "ino" indicates the inode number of the corresponding directory or file.

FIG. 5B illustrates a directory structure based on records 111a to 111g illustrated in FIG. 5A. In this example, under a root directory having an inode number "1", a subdirectory having a directory name "A" and an inode number "2" and a subdirectory having a directory name "B" and an inode number "4" have been generated. Under the subdirectory having a directory name "A", a file having a file name "X" and an inode number "3" is stored. Under the subdirectory having a directory name "B", a subdirectory having a directory name "C" and an inode number "5" has been generated. Under this subdirectory, a file having a file name "Y" and an inode number "6" and a file having a file name "Z" and an inode number "7" are stored.

FIG. 6 illustrates a data configuration example of the entry table. The entry table 112 holds management information for holding the metadata of the directories or files. The entry table 112 holds records each including items "ino", "mode", "nlink", "uid", "gid", "size", "atime", "mtime", and "ctime". Each record is associated with a single directory or file.

In a record, the item "ino" indicates the inode number of the corresponding directory or file, and the item "mode" indicates authority information. The item "plink" indicates the number of hard links, and the item "uid" indicates the user ID of the corresponding owner. The item "gid" indicates the group ID of the corresponding owner, and the item "size" indicates the size of the corresponding file. The item "atime" indicates the last access time, the item "mtime" indicates the last update time. The item "ctime" indicates the last state change time.

When writing of a new file is requested by the NAS client 210, records corresponding to the file are added by the file system processing unit 132 in the above directory table 111 and entry table 112.

FIG. 7 illustrates a data configuration example of the chunk map table. The chunk map table 113 holds management information for associating an individual file with chunks. The chunk map table 113 holds records each including items "ino", "offset", "size", "gno", and "gindex". Each record is associated with a single chunk generated by dividing the actual data of a file.

In a record, the item "ino" indicates the inode number of a file including the corresponding chunk, and the item "offset" indicates an offset amount from the top of the actual data of the file to the top of the corresponding chunk. A chunk in a file is uniquely determined by a combination of these items "ino" and "offset".

The item "size" indicates the size of the corresponding chunk. In the present embodiment, as an example, the size of an individual chunk is changeable. For example, the file system processing unit 132 determines the division locations of the actual data of a file in accordance with a predetermined arithmetic rule so that more chunks including the same data are generated. In this way, chunks having variable lengths are generated.

The item "gno" indicates the group number of the chunk group to which the actual data in the corresponding chunk (hereinafter, "chunk data") belongs, and the item "gindex" indicates the index number of the corresponding chunk data in the chunk group. A chunk and its chunk data are associated with each other by registering the items "ino", "offset", "gno", and "gindex" in a record.

In the example in FIG. 7, a file having an inode number "i1" has been divided into two chunks, and a file having an inode number "i2" has been divided into four chunks. In addition, the data in the two chunks included in the former file and the data in the first two chunks included in the latter file are stored in the data management unit 110 as the chunk data that belongs to a chunk group having a group number "g1". In addition, the data in the last two chunks included in the latter file are stored in the data management unit 110 as the chunk data that belongs to a chunk group having a group number "g2".

FIG. 8 illustrates a data configuration example of the chunk table. The chunk table 114 holds management information for holding information about individual chunk data. The chunk table 114 holds records each including items "hash", "size", "refcnt", "gno", and "gindex". Each record is associated with single chunk data.

In a record, the item "hash" indicates a hash value calculated from the corresponding chunk data, and the item "size" indicates the size of the corresponding chunk data. The item "gno" indicates the number of the chunk group to which the corresponding chunk data belongs, and the item "gindex" indicates the index number of the corresponding chunk data in the chunk group. Single chunk data is determined by a combination of the items "gno" and "gindex".

The item "refcnt" indicates a value of a "reference counter", and this value indicates the number of chunks in the corresponding file that the corresponding chunk data refers to. Namely, the item "refcnt" indicates the number of chunks sharing the corresponding chunk data.

For example, when the data of a chunk generated from a file is the same as the data of a chunk generated from another file, these data are associated with common chunk data. In this case, a single record corresponding to the chunk data is registered in the chunk table 114, and "2" is registered as the value of the reference counter in the item "refcnt". In addition, in this case, records corresponding to the individual chunks are registered in the chunk map table 113, and in these records, a common group number (gno) and a common index number (gindex) indicating the above chunk data are registered.

FIG. 9 illustrates a data configuration example of the chunk group table. The chunk group table 115 holds management information for holding information about individual chunk groups and for holding the chunk data included in the chunk groups. The chunk group table 115 holds records each including items "gno", "gindex", and "data". Each record is associated with single chunk data.

In a record, the item "gno" indicates the group number of the chunk group to which the corresponding chunk data belongs, and the item "gindex" indicates the index number of the corresponding chunk data in the chunk group. The item "data" indicates the corresponding chunk data itself. In the example in FIG. 9, four chunk data having index numbers "x1" to "x4" is included in a chunk group having a group number "g1". In addition, at least two chunk data having index numbers "x1" and "x2" is included in a chunk group having a group number "g2".

Figure 10:
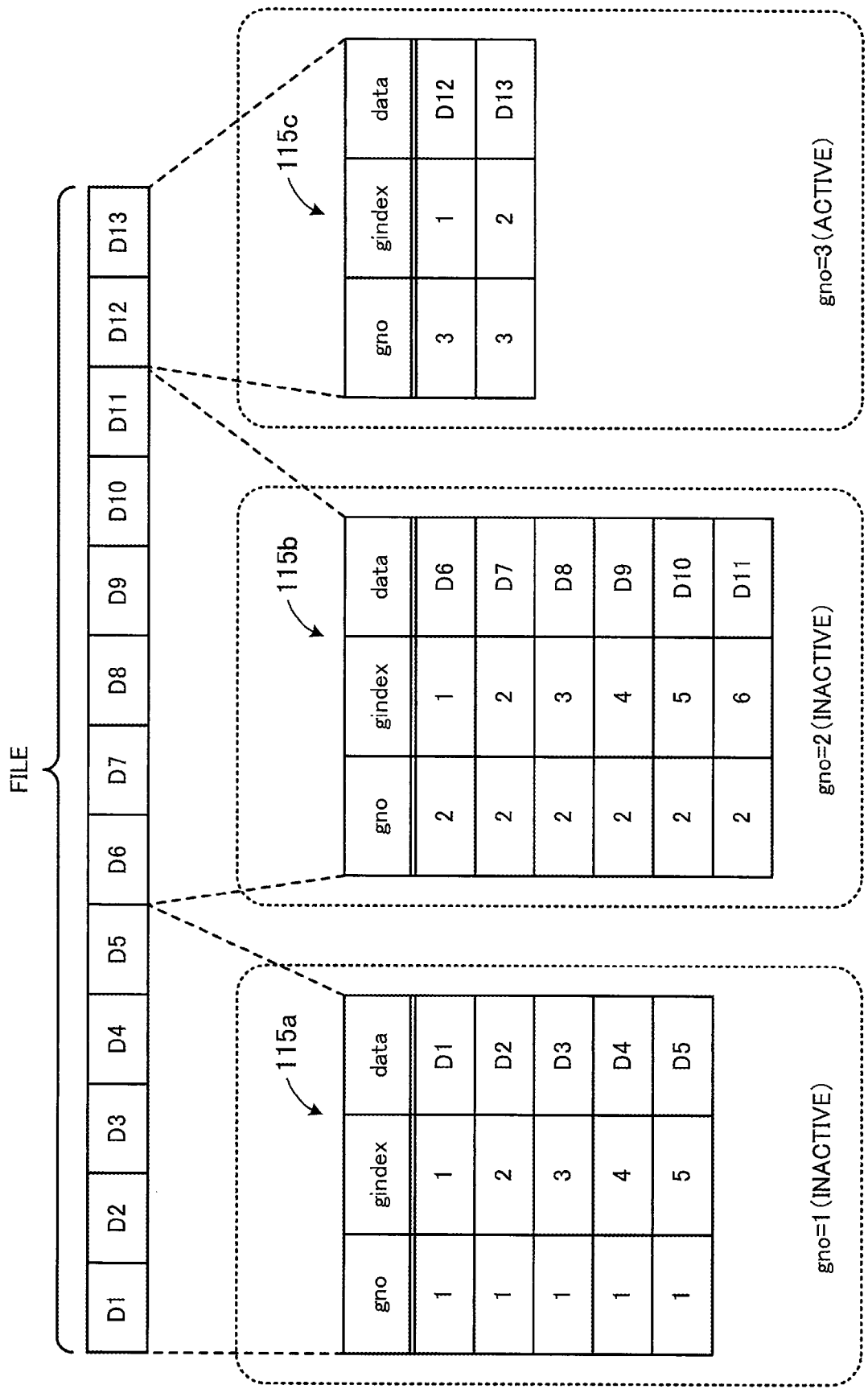
FIG. 10 illustrates a data configuration example of chunk groups.

FIG. 10 illustrates a configuration example of chunk groups. A method for generating chunks and chunk groups will be described with reference to FIG. 10.

A table 115a illustrated in FIG. 10 has been obtained by extracting the records corresponding to the chunk data that belongs to a chunk group having a group number "1" from the chunk group table 115. Likewise, a table 115b illustrated in FIG. 10 has been obtained by extracting the records corresponding to the chunk data that belongs to a chunk group having a group number "2" from the chunk group table 115. In addition, a table 115c illustrated in FIG. 10 has been obtained by extracting the records corresponding to the chunk data that belongs to a chunk group having a group number "3" from the chunk group table 115.

When the NAS client 210 requests writing of a new file or updating of an existing file, the file system processing unit 132 divides the actual data of the file into chunks. The example in FIG. 10 assumes that the file system processing unit 132 has divided the actual data of a file into 13 chunks. The data of the chunks will sequentially be expressed as data D1 to D13 from the top chunk to the last chunk. For simplicity, the following description assumes that the contents of the data D1 to D13 are different from each other (namely, no redundancy is found among the data D1 to D13). In this case, chunk data corresponding to the respective data D1 to D13 is stored.

A group number (gno) and an index number (gindex) in the chunk group indicated by the group number (gno) are allocated to individual chunk data. The index numbers are allocated in the order in which the chunk data that does not overlap with any other chunk data after file division has been generated. When the total size of the chunk data allocated to the same group number reaches a certain amount, the group number is incremented, and the incremented group number is allocated to the next chunk data.

Hereinafter, the state of a chunk group whose total chunk data size has not reached the certain amount will be referred to an "active" state. When a chunk group is in this active state, the chunk group is able to accept the next chunk data. In addition, the state of a chunk group whose total chunk data size has reached the certain amount will be referred to as an "inactive" state. When a chunk group is in this inactive state, the chunk group is not able to accept the next chunk data.

In the example in FIG. 10, first, the data D1 to D5 is allocated to a chunk group having a group number "1". When the size of the chunk group having the group number "1" reaches the certain amount, this chunk group becomes inactive. Consequently, the next data D6 is allocated to a chunk group having a new group number "2".

Subsequently, the data D6 to D11 is allocated to the chunk group having the group number "2", and this chunk group becomes inactive. Consequently, the next data D12 is allocated to a chunk group having a new group number "3". In the example in FIG. 10, while the data D12 and D13 is allocated to the chunk group having the group number "3", the chunk group is still in the active state at this point. In this case, a group number "3" and an index number "3" are allocated to the chunk data generated next (not illustrated).

An individual inactive chunk group is a data unit used when the actual data in a file is transferred to the cloud storage 240. When a chunk group becomes inactive, a single object (a data object to be described below) is generated from the chunk group and transferred to the cloud storage 240.

The following description will be made with reference to FIG. 4 again.

The cloud transfer processing unit 133 transfers various data stored in the data management unit 110 to the cloud storage 240 asynchronously with the data operation performed by the file system processing unit 132 on the data management unit 110. As described above, data is transferred to the cloud storage 240 per object.

As illustrated in FIG. 4, the cloud transfer processing unit 133 generates three kinds of objects, which are a file object 141, a chunk map object 142, and a chunk group object 143, and transfers these objects to the cloud storage 240. Next, the data configurations of the file object 141, the chunk map object 142, and the chunk group object 143 will be described with reference to FIGS. 11A, 11B, and 12.

FIGS. 11A and 11B illustrate data configuration examples of the file object and the chunk map object. FIG. 11A illustrates the file object 141, and FIG. 11B illustrates the chunk map object 142.

The file object 141 is an object for storing information registered in the directory table 111 and the entry table 112 in the cloud storage 240 per file. As illustrated in FIG. 11A, the file object 141 includes items "parent" and "name" indicating object names. Among the records in the directory table 111, the information registered in the same items "parent" and "name" included in a record of a corresponding file is copied in the items "parent" and "name" of the file object 141. Thus, in this example, a file corresponding to the file object 141 is determined by the items "parent" and "name".

In addition, the file object 141 includes "ino", "mode", "nlink", "uid", "gid", "size", "atime", "mtime", and "ctime" as the items indicating object values. Among the records in the directory table 111, the information registered in the item "ino" included in the record of the file indicated by the object names "parent" and "name" is copied in the item "ino" of the file object 141. Among the records in the entry table 112, the information registered in the same items included in the record of the file indicated by the item "ino" is copied in the items "mode", "plink", "uid", "gid", "size", "atime", "mtime", and "ctime" of the file object 141.

The chunk map object 142 is an object for storing information registered in the chunk map table 113 and the chunk table 114 in the cloud storage 240 per file. As illustrated in FIG. 11B, the chunk map object 142 includes "ino" as the item indicating an object name. Among the records in the chunk map table 113, the information registered in the item "ino" included in a record of a corresponding file is copied in the item "ino" of the chunk map object 142. Thus, in this example, a file corresponding to the chunk map object 142 is determined by the item "ino".

In addition, the chunk map object 142 includes "offset", "size", "hash", "gno", and "gindex" as the items indicating object values. Among the records in the chunk map table 113, the information registered in the same items included in the record corresponding to the file indicated by the item "ino" is copied in the items "offset", "size", "gno", and "gindex" of the chunk map object 142. Among the records in the chunk table 114, the hash value registered in the item "hash" included in the record corresponding to the chunk group indicated by the items "gno" and "gindex" is copied in the item "hash" of the chunk map object 142.

Normally, the chunk map table 113 includes records corresponding to respective chunks associated with a single file determined by "ino". Thus, the information registered as the relevant items for all the chunks associated with the corresponding file is included as the object values of the chunk map object 142.

The file object 141 and the chunk map object 142 as described above are transferred to the cloud storage 240. In this way, not only the actual data of a file, but also the management information, such as the metadata of the file and the configuration information about the chunks associated with the file, is stored in the cloud storage 240. Thus, for example, even when the operation of the cloud storage gateway 100 stops due to an abnormality, the directory structure of the file and the configuration of the chunks are restored.

Figure 12:
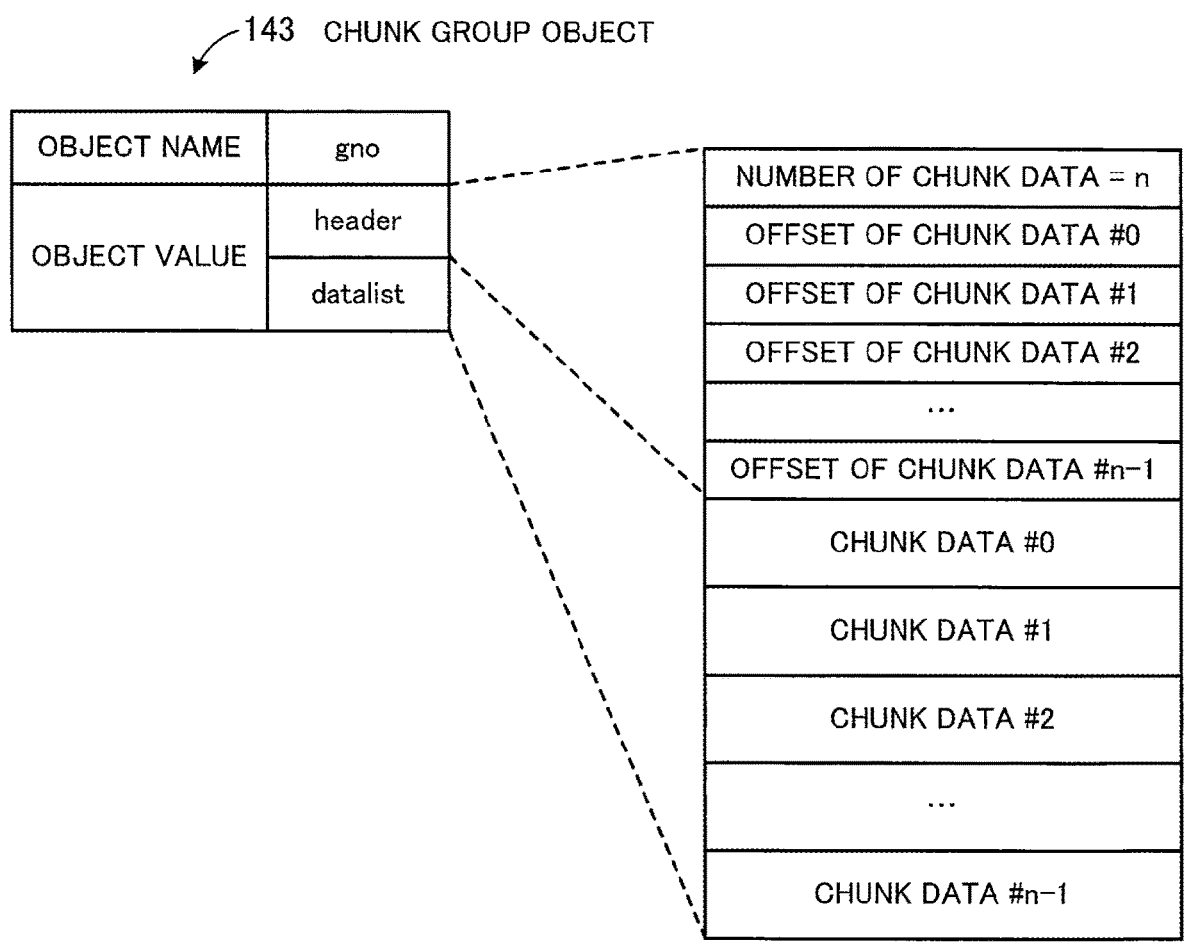
FIG. 12 illustrates a data configuration example of a chunk group object.

FIG. 12 illustrates a data configuration example of the chunk group object. The chunk group object 143 is an object for storing information, which is registered in the chunk group table 115 and includes the actual data of a file, in the cloud storage 240 per chunk group. As illustrated in FIG. 12, the chunk group object 143 includes "gno" as the item indicating an object name. Among the records in the chunk group table 115, information registered in the item "gno" included in a record indicating a corresponding chunk group is copied in the item "gno". Thus, a chunk group corresponding to the chunk group object 143 is determined by the item "gno".

In addition, the chunk group object 143 includes items "header" and "datalist" as object values. Normally, the chunk group table 115 includes records corresponding to a plurality of chunk data included in a single chunk group. In FIG. 12, n chunk data is included in a chunk group indicated by the object name "gno".

Among the records in the chunk group table 115, the information registered in the items "data" in the records corresponding to the chunk data included in the chunk group indicated by the object name "gno" is copied in the item "datalist". In the example in FIG. 12, chunk data #*0 to #n-1 having respective index numbers (gindex) "0" to "n-1" are set in the item "datalist". By setting chunk data (actual data of a file) in the item "datalist" as object values in this way, the chunk data is transferred to and stored in the cloud storage 240.

In the item "header", first, the number of chunk data set in the item "datalist", namely, the number of chunk data included in the corresponding chunk group, is set. Next, in the item "header", an offset amount from the top of the chunk group is set for each chunk data set in the item "datalist".

Next, problems that arise when the cloud transfer processing unit 133 generates objects as illustrated in FIGS. 11A, 11B, and 12 will be described with reference to FIG. 4.

The cloud transfer processing unit 133 needs to determine the information that needs to be transferred to the cloud storage 240 as objects from the information registered in the data management unit 110. For example, to determine the information, the cloud transfer processing unit 133 may monitor all the information registered in the data management unit 110. Since the cloud transfer processing unit 133 operates asynchronously with the file system processing unit 132, which updates information registered in the data management unit 110, it is difficult for the cloud transfer processing unit 133 to directly receive a notification about an updated portion of the registered information from the file system processing unit 132. Thus, by monitoring all the information registered in the data management unit 110, the cloud transfer processing unit 133 is able to recognize an updated portion of the registered information and determine the information that needs to be transferred to the cloud storage 240. However, this method has a problem in that the processing load needed for monitoring all the information registered in the data management unit 110 is heavy and the processing efficiency is low.

In addition, according to the technique discussed in the above Japanese Laid-open Patent Publication No. 2012-

141738, per partitioned database, which is a transfer unit of data to be updated in an online storage, a Dirty flag indicating whether the corresponding content has been updated is stored. By using this technique, a flag indicating whether a content has been updated may be stored in each information group included in an object in the information registered in the data management unit 110. In accordance with this method, since the cloud transfer processing unit 133 only needs to refer to the flags corresponding to the respective information groups to determine the information group that needs to be transferred, the processing efficiency is improved. However, since the cloud transfer processing unit 133 needs to refer to the flags corresponding to all the information groups including the information groups that are not transferred, the processing efficiency is not high.

In addition, in accordance with the above method using the flags, while the cloud transfer processing unit 133 is transferring an object, if the file system processing unit 132 has updated the original information group corresponding to the object, the cloud transfer processing unit 133 is unable to recognize the occurrence of the update. Thus, the above method has a problem in that the update content of the information group could not be reflected accurately on the cloud storage 240.

To solve these problems, according to the present embodiment, the operation log management unit 120 is used so that the cloud transfer processing unit 133 is able to efficiently and accurately determine the information that needs to be transferred. As illustrated in FIG. 4, the operation log management unit 120 holds an operation log table 121. Records indicating operation logs are registered in the operation log table 121 in a first-in first-out (FIFO) manner per information group included in an object in the information registered in the data management unit 110. The operation logs are classified into two kinds of operation logs, which are file operation logs 122 and data operation logs 123.

The information groups corresponding to the operation logs are classified into two kinds, which are file-related information groups and chunk-group-related information groups. A file-related information group is an information group for generating a file object 141 and a chunk map object 142 as described above and is generated and updated per file. This information group includes information about a single file registered in the directory table 111, the entry table 112, the chunk map table 113, and the chunk table 114. An operation log corresponding to this information group is a file operation log 122 as described above, and the cloud transfer processing unit 133 refers to an individual file operation log 122, to determine whether to transmit a file object 141 and a chunk map object 142, which are objects per file.

In contrast, a chunk-group-related information group is an information group for generating a chunk group object 143 and is generated and updated per chunk group. This information group includes information about a single chunk group registered in the chunk group table 115, and the information also includes chunk data (actual data of the corresponding file). An operation log corresponding to this information group is a data operation log 123 as described above, and the cloud transfer processing unit 133 refers to an individual data operation log 123, to determine whether to transmit a chunk group object 143, which is an object per chunk group.

An individual operation log holds a value of an update counter. The value of the update counter is incremented each time the file system processing unit 132 performs an operation on the corresponding information group. Since the cloud transfer processing unit 133 compares the two values of the update counter with each other, one being obtained before the completion of the transfer of an object to the cloud storage 240 and the other being obtained after the completion, the cloud transfer processing unit 133 is able to recognize the occurrence of an update performed on the original information group during the transmission processing.

The cloud transfer processing unit 133 temporarily stores an update counter value, which has been stored in an operation log, in a count value storage unit 133a. The count value storage unit 133a is a temporary storage area realized by the RAM 102, for example.

Figure 13:
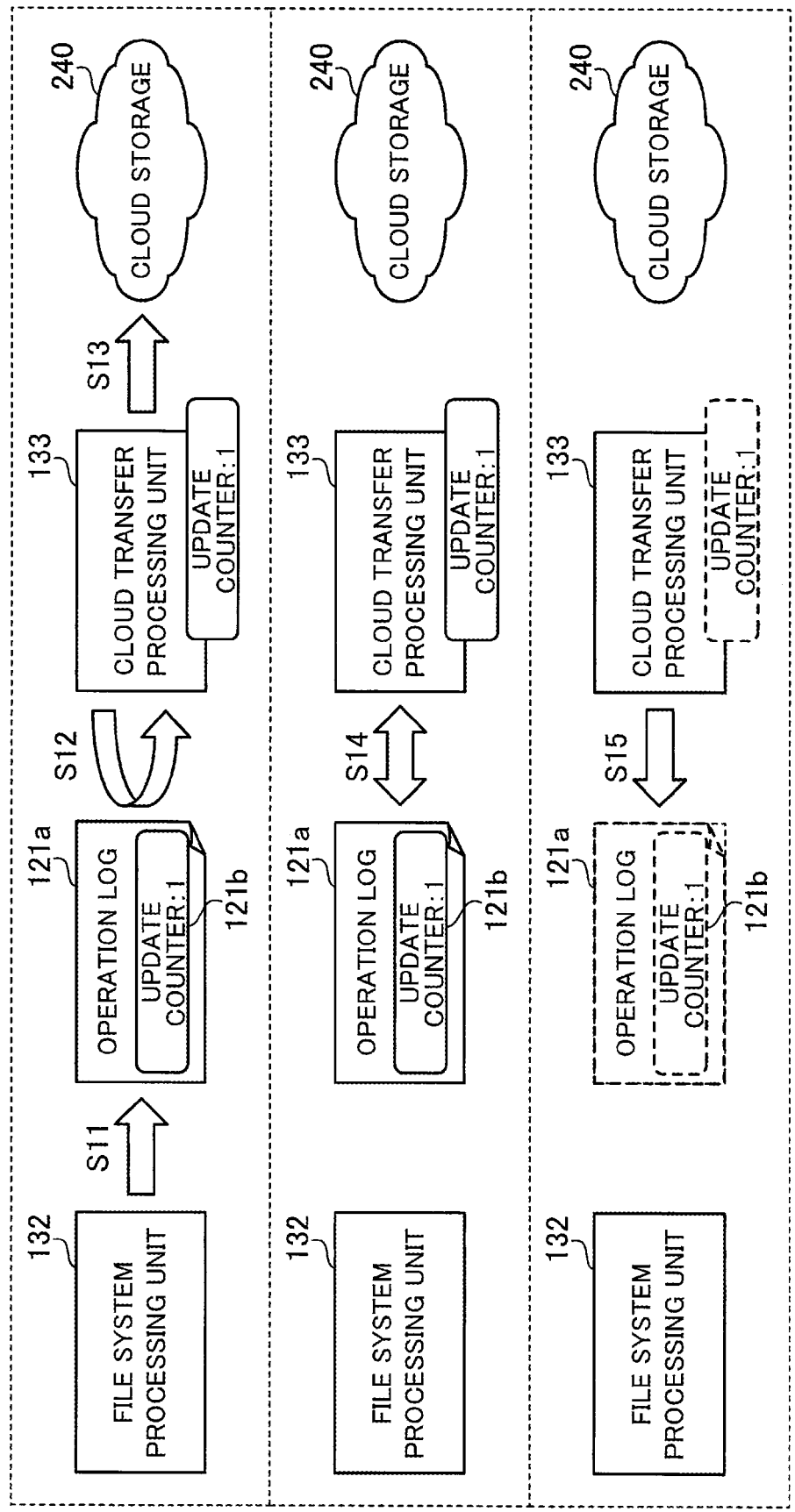
FIG. 13 illustrates a first processing example about registration of an operation log and transmission of objects.

FIG. 13 illustrates a first processing example about registration of an operation log and transmission of objects. The example in FIG. 13 assumes that, first, the file system processing unit 132 has performed an operation on an information group in the data management unit 110. This information group is a file-related information group or chunk-group-related information group described above.

At this point, if no operation log corresponding to the operation target information group exists in the operation log table 121, the file system processing unit 132 generates a new operation log 121a corresponding to this information group and registers the new operation log 121a in the operation log table 121 (step S11). In this step, in the operation log 121a, the operation content performed on the information group is stored as log information, and an initial value "1" is stored as the value of the update counter 121b.

The operation logs are registered in the operation log table 121 in a FIFO manner. By sequentially acquiring the operation logs from the top operation log in the operation log table 121, the cloud transfer processing unit 133 determines the information groups that need to be transmitted as objects. The example in FIG. 13 assumes that the cloud transfer processing unit 133 has acquired the operation log 121a. Next, the cloud transfer processing unit 133 temporarily stores the value "1" of the update counter 121b, which has been stored in the operation log 121a, in the count value storage unit 133a (step S12). Next, the cloud transfer processing unit 133 generates an object based on the operation content stored in the operation log 121a and transmits the object to the cloud storage 240 (step S13). While this processing will be described in detail below, the cloud transfer processing unit 133 is able to determine which information needs to be extracted from the corresponding information group and which kind of object needs to be transmitted, based on the operation content stored in the operation log 121a.

When completing the processing for transmitting the object to the cloud storage 240, the cloud transfer processing unit 133 refers to the same operation log 121a again and acquires the value of the update counter 121b. The cloud transfer processing unit 133 compares the acquire value of the update counter 121b with the value of the update counter stored in the count value storage unit 133a in step S12 (step S14).

In the example in FIG. 13, these values are the same. In this case, the cloud transfer processing unit 133 determines that the object transmission processing corresponding to the operation content stored in the operation log 121a has been completed and removes the operation log 121a from the operation log table 121 (step S15). Next, the cloud transfer processing unit 133 acquires the next operation log from the operation log table 121 and performs the object transmission processing, based on the content of the acquired operation log.

Figure 14:
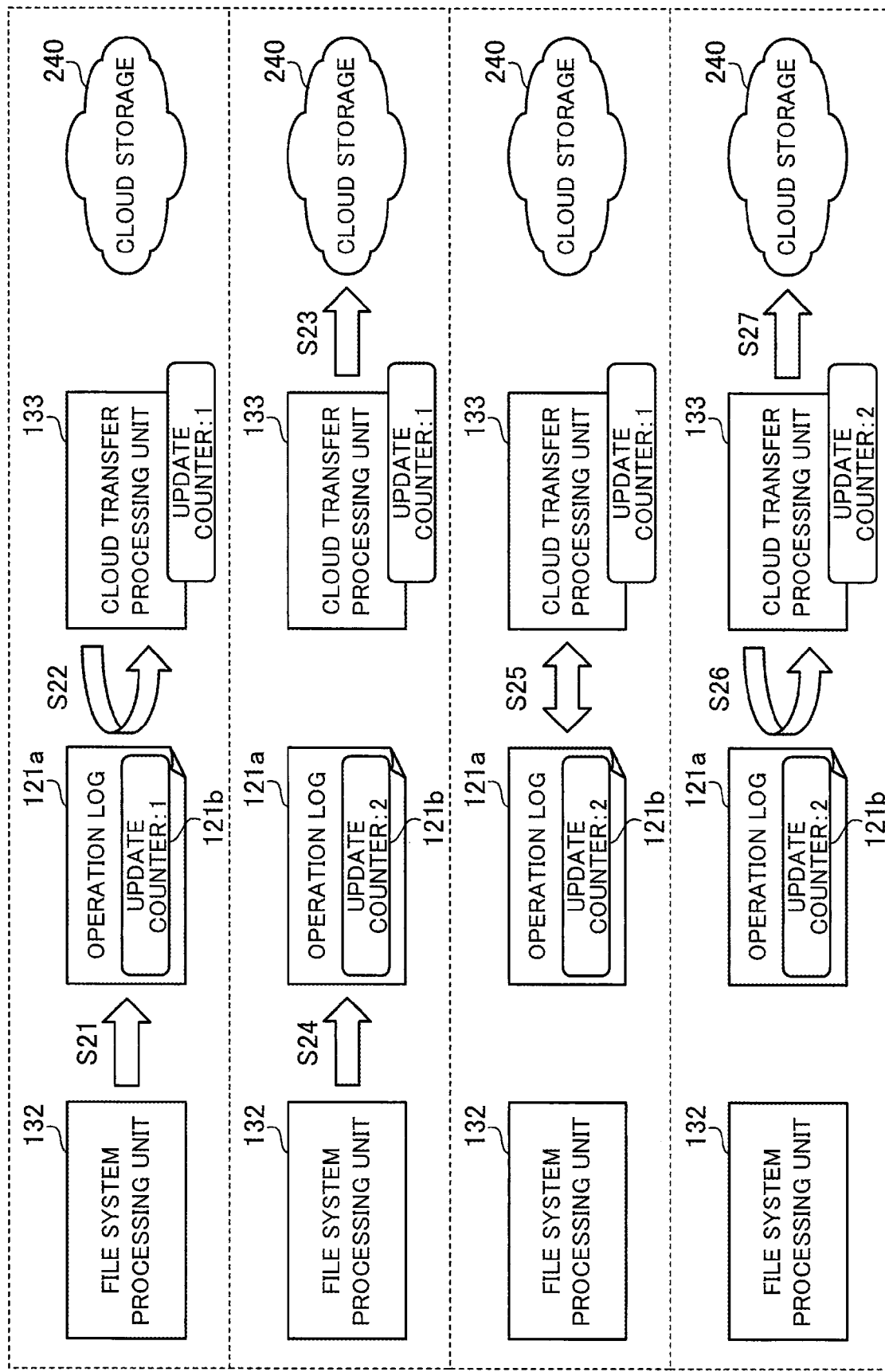
FIG. 14 illustrates a second processing example about registration of an operation log and transmission of objects.

FIG. 14 illustrates a second processing example about registration of an operation log and transmission of objects. As in the example in FIG. 13, the example in FIG. 14 assumes that, first, the file system processing unit 132 has performed an operation on an information group in the data management unit 110 and that no operation log corresponding to the operation target information group exists in the operation log table 121 at this point. In this case, the file system processing unit 132 generates a new operation log 121a corresponding to the information group and registers the new operation log 121a in the operation log table 121 (step S21). In the operation log 121a, the operation content performed on the information group is stored as log information, and an initial value "1" is stored as the value of the update counter 121b.

In addition, the cloud transfer processing unit 133 acquires the operation log 121a and temporarily stores the value "1" of the update counter 121b, which has been stored in the operation log 121a, in the count value storage unit 133a (step S22). Next, the cloud transfer processing unit 133 generates an object based on the operation content stored in the operation log 121a and transmits the object to the cloud storage 240 (step S23).

The following description assumes that, before the transmission of the object is completed, the file system processing unit 132 has performed another operation on the information group corresponding to the operation log 121a. In this case, the file system processing unit 132 refers to the operation log table 121 and determines whether an operation log corresponding to the operation target information group is registered in the operation log table 121. If the corresponding operation log 121a is registered, the file system processing unit 132 stores the operation content in the operation log 121a and increments the value of the update counter 121b to "2" (step S24).

When completing the processing for transmitting the object to the cloud storage 240, the cloud transfer processing unit 133 refers to the same operation log 121a again and acquires the value of the update counter 121b. Next, the cloud transfer processing unit 133 compares the acquired value of the update counter 121b with the value of the update counter stored in the count value storage unit 133a in step S22 (step S25).

In the example in FIG. 14, these values are different from each other. In this case, the cloud transfer processing unit 133 determines that the object transmission processing corresponding to the operation content stored in the operation log 121a has not been completed. Thus, the cloud transfer processing unit 133 acquires the operation log 121a from the operation log table 121 again and temporarily stores the value "2" of the update counter 121b, which has been stored in the acquired operation log 121a, in the count value storage unit 133a (step S26). Next, the cloud transfer processing unit 133 generates an object based on the operation content stored in the acquired operation log 121a and transmits the object to the cloud storage 240 (step S27).

The cloud transfer processing unit 133 repeats the processing in steps S24 to S27 until the value of the update counter stored in the count value storage unit 133a matches the value of the update counter 121b acquired again from the operation log table 121. When these values match, the cloud transfer processing unit 133 removes the operation log 121a from the operation log table 121.

In accordance with the processing illustrated in FIGS. 13 and 14, only a single operation log is registered per information group in the operation log table 121. In addition, when a file operation log corresponding to an information group is already registered in the operation log table 121, if another operation is performed on this information group, this new operation content is stored in the registered operation log. In addition, when the processing for transmitting the objects corresponding to all the operation contents stored in the operation log is completed, the operation log is removed from the operation log table 121.

In accordance with this method, the storage capacity of the operation log table 121 is reduced. In addition, since the operation logs are registered in the operation log table 121 in a FIFO manner, the cloud transfer processing unit 133 is able to determine an information group that needs to be transmitted as an object only by sequentially referring to the operation logs from the top operation log in the operation log table 121. Thus, the processing load of the cloud transfer processing unit 133 is reduced, and the processing efficiency is improved.

In addition, as illustrated in FIGS. 13 and 14, even when an information group is updated while information included in this information group is being transmitted as an object, the cloud transfer processing unit 133 is able to transmit the update content to the cloud storage 240 as an object by using the values of the update counter. Specifically, when the value of the update counter 121b acquired again in step S25 in FIG. 14 does not match the value of the update counter stored in the count value storage unit 133a, the cloud transfer processing unit 133 recognizes that the corresponding information group has been updated. Thus, in step S27, the cloud transfer processing unit 133 generates an object including the update content of the information group based on the updated operation log 121a and transmits the object to the cloud storage 240. Through this processing, the update content of the information group is accurately reflected on the cloud storage 240.

When the file system processing unit 132 stores a new operation content in an existing operation log, there are cases in which the file system processing unit 132 additionally stores the new operation content in the operation log, instead of overwriting the operation content already been stored in the operation log with the new operation content. For example, if first information included in the information group corresponding to the operation log 121a is updated in step S24 in FIG. 14, the value of the update counter 121b is incremented to "2". In addition, if second information, which is different from the first information and is included in the same information group, is updated before completion of the object transmission processing in step S23, the value of the update counter 121b is incremented to "3".

In this case, when the file system processing unit 132 has updated the first information, the file system processing unit 132 stores a first operation content corresponding to the object including the first information in the operation log 121a. In addition, when the file system processing unit 132 has updated the second information, the file system processing unit 132 additionally stores a second operation content corresponding to the object including the second information in the operation log 121a without removing the first operation content.

In this way, when completing the transmission of the objects and acquiring the operation log 121a again, the cloud transfer processing unit 133 generates both the object corresponding to the first operation content and the object corresponding to the second operation content and transmits the generated objects to the cloud storage 240. Namely, since the first operation content remains in the operation log 121a, the cloud transfer processing unit 133 is able to accurately reflect not only the update content of the second information but also the update content of the first information updated before the update of the second information on the cloud storage 240.

Next, the operation logs will be described in detail with reference to FIGS. 15 to 17.

FIG. 15 illustrates a data configuration example of the operation log table. Among the records in the operation log table 121, an individual record indicating a file operation log includes items "counter", "type", "ino", "action", and "update". In addition, among the records in the operation log table 121, an individual record indicating a data operation log includes items "counter", "type", "gno", "action", and "update".

The item "counter" in a record indicates the identification number of the record (namely, this operation log). These identification numbers are given in the order in which the operation logs are registered in the operation log table 121. The item "type" in an operation log indicates whether this operation log is a file operation log or a data operation log. In the example in FIG. 15, operation logs 121-1 and 121-3 are file operation logs, and operation logs 121-2 and 121-4 are data operation logs.

The item "ino" in a file operation log indicates the inode number of this file operation log, and the file operation log is associated with a corresponding file by this inode number. The item "gno" in a data operation log indicates the group number of a chunk group corresponding to the data operation log, and the data operation log is associated with the chunk group by this group number.

The item "action" in an operation log indicates the content of an operation performed by the file system processing unit 132. The kind of object that needs to be transmitted and information that needs to be copied from the data management unit 110 to an object is previously determined per operation content stored in the item "action". Thus, from the operation content stored in the item "action", the cloud transfer processing unit 133 is able to generate an object that is needed and transmit the generated object to the cloud storage 240.

The item "update" in an operation log indicates the value of the above update counter. The initial value of the update counter is "1", and this value is incremented each time the file system processing unit 132 performs an operation on the corresponding information group.

Next, the operation contents stored in the item "action" in an operation log will be described in detail.

First, the operation contents stored in the item "action" in a file operation log will be described. Examples of the operation contents include "file being created", "file update", "file created", and "file removal".

The operation content "file being created" is log information stored when information registered in the directory table 111 and the entry table 112 is updated in response to a file operation request from the NAS client 210. The "file operation request" is transmitted from the NAS client 210 and is a request for writing a new file, a request for updating the file, or a request for removing the file. When "file being created" is stored, the information in the record, which is registered in the directory table 111 and the entry table 112 and corresponds to the above file, is used as the transfer target by using the file object 141.

The operation content "file update" is log information stored when management information about actual data of the file is updated after the operation corresponding to "file being created". At the time when "file update" is stored, part of the information in the record, which is registered in the entry table 112 and corresponds to the above file, has been updated from the time when "file being created" was stored. Thus, at this point, the information in the record, which is registered in the entry table 112 and corresponds to the above file, is used as the transfer target by using the file object 141.

The operation content "file created" is log information stored when all the processing based on a file operation request from the NAS client 210 is completed. At this point, the information in the record, which is registered in the chunk map table 113 and the chunk table 114 and corresponds to the above file, is used as the transfer target by using the chunk map object 142.

These "file being created", "file update", and "file created" indicate the contents of the operations performed step by step by the file system processing unit 132 when the NAS client 210 requests writing of a new file or updating a file until the processing based on the request is completed.

In contrast, when the NAS client 210 requests removal of a file, "file removal" is stored in "action".

In this case, the records associated with the removal target file is removed from the directory table 111, the entry table 112, and the chunk map table 113. Thus, when "file removal" is stored, a request for removing the file object 141 and the chunk map object 142 specifying the respective object names indicating the removal target file is transmitted to the cloud storage 240.

Figure 16:
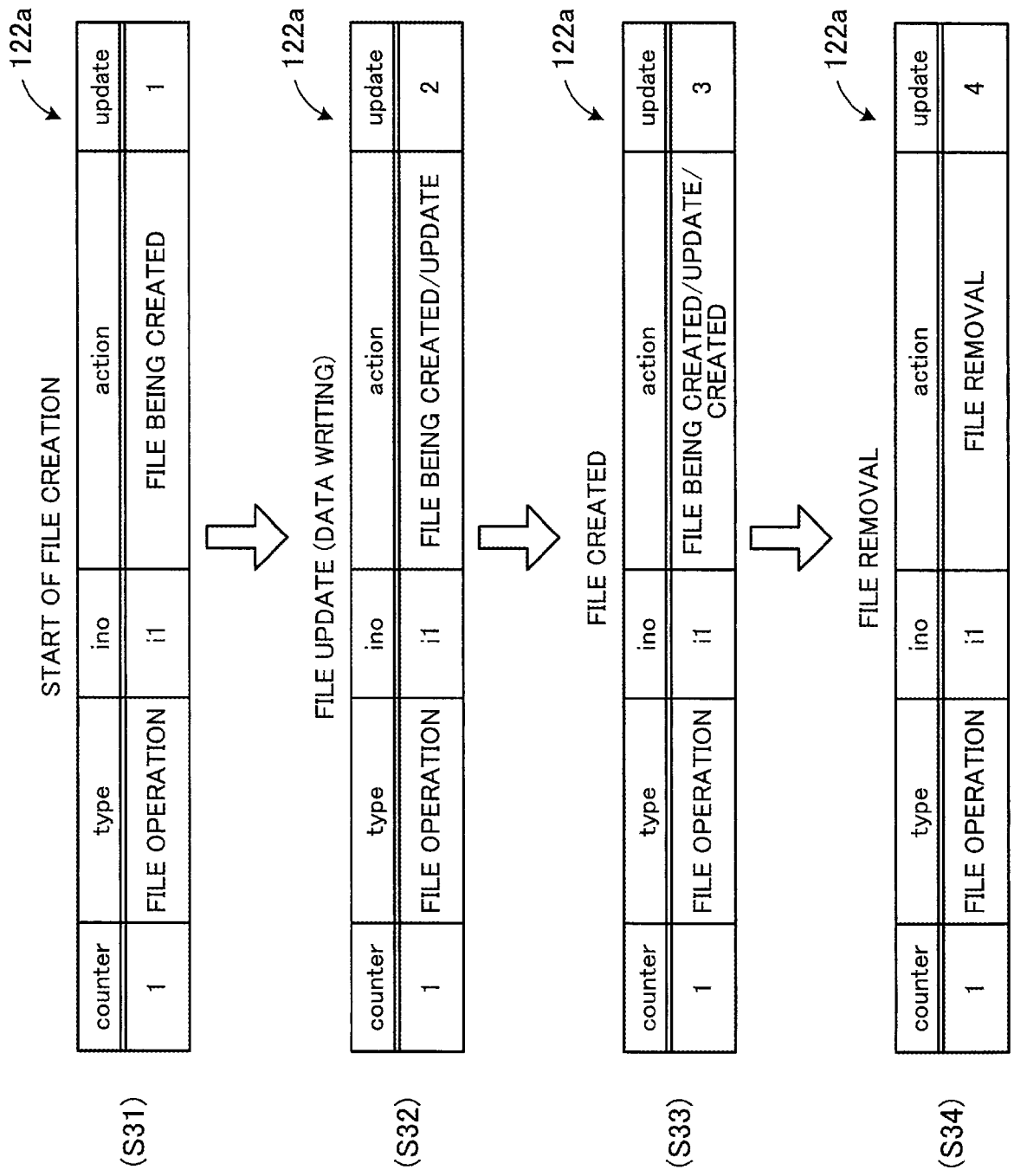
FIG. 16 illustrates a registration processing example of a file operation log.

FIG. 16 illustrates an example of processing for registering a file operation log. When receiving a request for writing a new file from the NAS client 210, the file system processing unit 132 registers a file operation log 122a corresponding to this file in the operation log table 121 (step S31). In the file operation log 122a, "file being created" is stored in "action", and "1" is stored as the value of the update counter in "update".

In addition, after the file write request, the file system processing unit 132 receives the actual data of the file from the NAS client 210 and stores the actual data in the data management unit 110. The present description assumes that the cloud transfer processing unit 133 acquires the file operation log 122a at this point. In this case, the cloud transfer processing unit 133 recognizes the target file from "ino" in the file operation log 122a. In addition, the cloud transfer processing unit 133 reads needed information determined from "file being created" from the data management unit 110, generates a file object 141 including the read information, and transmits the generated file object 141 to the cloud storage 240.

The present description assumes that, before the completion of the transmission of the file object 141, the processing for storing the actual data of the file in the data management unit 110 is completed. In this case, the file system processing unit 132 additionally stores "file update" in "action" in the file operation log 122a and increments the value in "update" to "2" (step S32).

In addition, the present description assumes that the whole processing performed in response to the write request from the NAS client 210 is completed before the completion of the transmission of the file object 141. Alternatively, the present description assumes that, before the completion of the transmission of the file object 141 based on "file update", the whole processing performed in response to the update request from the NAS client 210 is completed. In these cases, the file system processing unit 132 additionally store "file created" in "action" in the file operation log 122a and increments the value in "update" to "3" (step S33).

In the operation content "action", for example, "0x01" is registered as a value indicating "file being created", "0x02" is registered as a value indicating "file update", and "0x04" is registered as a value indicating "file created". When a value is stored in "action", a logical sum of a new value to be stored in "action" and a value already stored in "action" is calculated, and the value already stored is overwritten by the calculated value in "action". For example, in the state in step S32, a logical sum "0x03" of "0x01" indicating "file being created" and "0x02" indicating "file update" is stored in "action". Namely, in this example, a bit string having bits indicating respective "file being created", "file update", and "file created" is stored in "action". When any one of these operation contents is recorded, the bit indicating the operation content is updated from "0" to "1".

The following description assumes that, before the transmission of the file object 141 based on "file being created" or "file update" is completed, the NAS client 210 requests removal of the file. Alternatively, the following description assumes that, before the transmission of the chunk map object 142 based on "file created" is completed, the NAS client 210 requests removal of the file. In these cases, the file system processing unit 132 stores "file removal" in "action" in the file operation log 122a and increments the value in "update" to "4" (step S34).

When "file removal" is stored, the file object 141 and the chunk map object 142 specifying the respective object names indicating the removal target file are removed from the cloud storage 240. Thus, the information already stored in "action" may be overwritten by "file removal".

Next, operation contents stored in "action" in a data operation log will be described. Examples of the operation contents include "data being written", "data written", and "data removal".

The operation content "data being written" indicates the state in which the total size of the chunk data included in the corresponding chunk group has not yet reached a predetermined size. Namely, "data being written" indicates that the corresponding chunk group is active. In the state in which "data being written" is stored, no objects that need to be transmitted to the cloud storage 240 are generated. When "data being written" is registered in "action" in a data operation log, the cloud transfer processing unit 133 skips the processing based on the data operation log and acquires the next data operation log stored in the operation log table 121.

The operation content "data written" indicates a state in which the total size of the chunk data included in the corresponding chunk group has reached the predetermined size. Namely, "data written" indicates that the corresponding chunk group is inactive. In this case, the information in the records, which are registered in the chunk group table 115 and correspond to the chunk group, is used as the transfer target by using the chunk group object 143.

The operation content "data removal" indicates that the corresponding chunk group is to be removed. In this state, all the chunk data included in the chunk group is in an invalid state due to file removal or update (namely, the values of the reference counters corresponding to all the chunk data indicate "0"). In this case, the records associated with the removal target chunk group are removed from the chunk map table 113. Thus, when "data removal" is stored, a request for removing the chunk group object 143 specifying the object name indicating the removal target chunk group is transmitted to the cloud storage 240.

Figure 17:
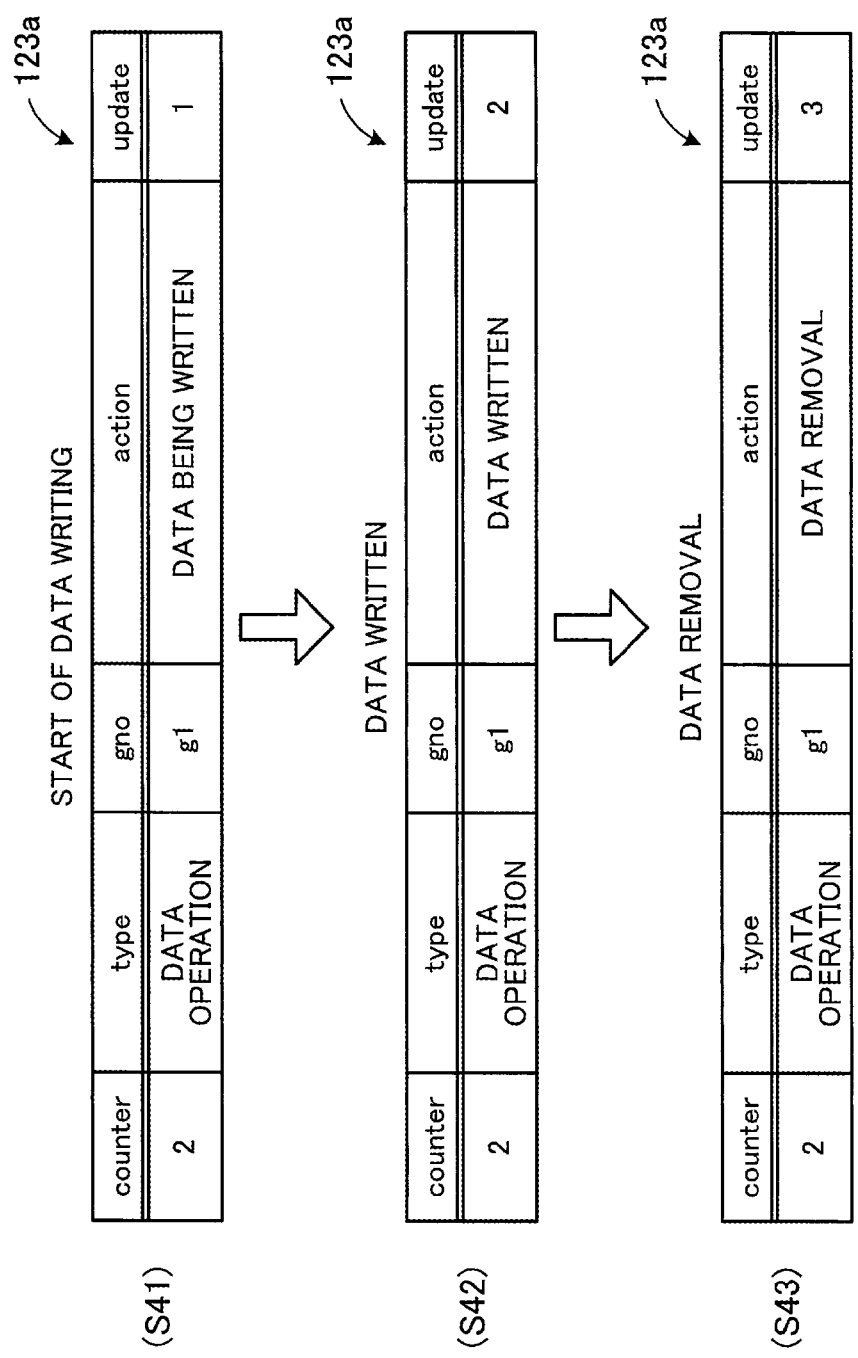
FIG. 17 illustrates a registration processing example of a data operation log.

FIG. 17 illustrates a registration processing example of a data operation log. When the file system processing unit 132 generates a new chunk group in response to a request for writing or updating a file from the NAS client 210, the file system processing unit 132 registers a data operation log 123a corresponding to this chunk group in the operation log table 121 (step S41). At this point, "data being written" is stored in "action", and the initial value "1" of the update counter is stored in "update".

Subsequently, if the total size of the chunk data included in the above chunk group reaches a predetermined size, the file system processing unit 132 overwrites the information in "action" in the data operation log 123a with "data written" and increments the value in "update" to "2" (step S42).

The following description assumes that the cloud transfer processing unit 133 acquires the data operation log 123a and recognizes that "data written" has been stored in "action". In this case, the cloud transfer processing unit 133 recognizes the target chunk group from "gno" in the data operation log 123a. In addition, the cloud transfer processing unit 133 reads the information from the records of the corresponding chunk group registered in the chunk group table 115, generates a chunk group object 143 including the read information, and transmits the chunk group object 143 to the cloud storage 240.

In this state, if all the chunk data included in the chunk group corresponding to the data operation log 123a is made invalid before the completion of the transmission of the chunk group object 143, the file system processing unit 132 overwrites the information in "action" in the data operation log 123a with "data removal" and increments the value in "update" to "3" (step S43). The cloud transfer processing unit 133 is able to recognize that the corresponding chunk group is not needed by acquiring the data operation log 123a again after the completion of the transmission of the chunk group object 143. Next, the cloud transfer processing unit 133 is able to remove the chunk group object 143 corresponding to this chunk group from the cloud storage 240. In this way, the update content in the chunk group table 115 based on the removal of the chunk group is reflected on the cloud storage 240.

Next, processing of the cloud storage gateway 100 will be described with reference to flowcharts. First, processing performed when writing of a new file is requested by the NAS client 210 will be described with reference to FIGS. 18 to 22.

Figure 18:
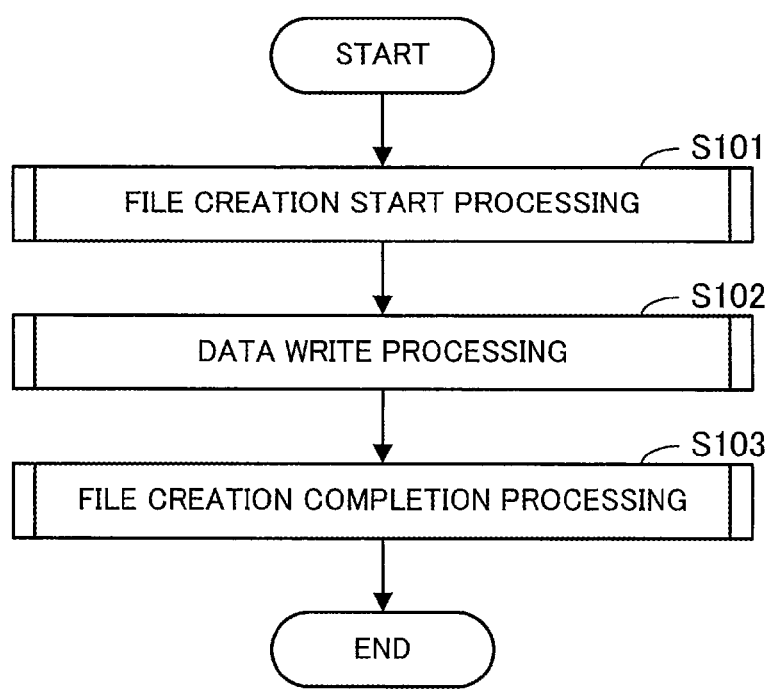
FIG. 18 is a flowchart illustrating an example of processing performed by a file system processing unit when a file is requested to be written.

FIG. 18 is a flowchart illustrating an example of processing of the file system processing unit performed when writing of a file is requested.

[Step S101] The file system processing unit 132 receives a file write request from the NAS client 210 via the NAS service processing unit 131. In the file write request, directory information indicating a destination where the file is to be written, a file name, and a file size are specified. When receiving the write request, the file system processing unit 132 performs file creation start processing.

[Step S102] When receiving actual data to be written in the file via the NAS service processing unit 131, the file system processing unit 132 performs data write processing.

[Step S103] Upon completion of the data write processing, the file system processing unit 132 transmits acknowledgement information indicating the completion of the writing to the NAS client 210 via the NAS service processing unit 131. Along with this, the file system processing unit 132 performs file creation completion processing.

Figure 19:
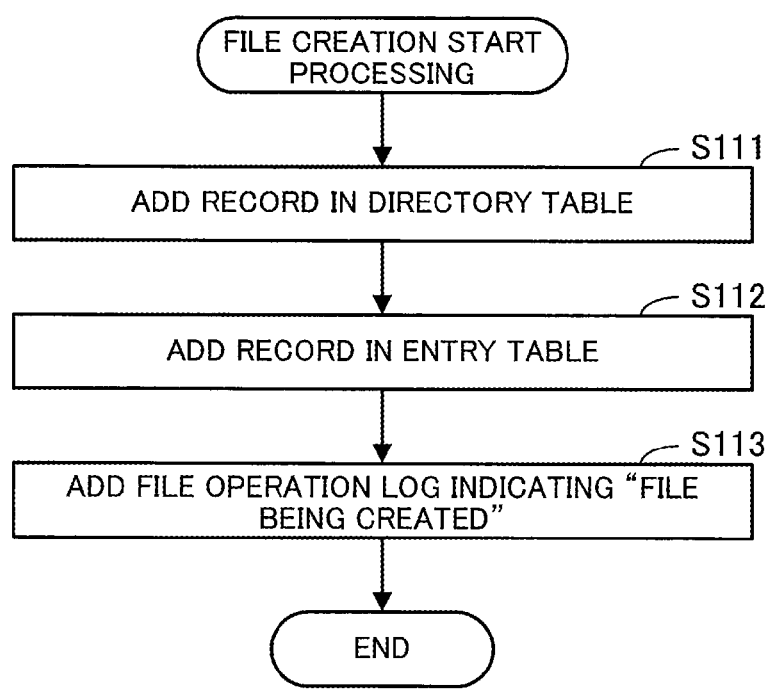
FIG. 19 is a flowchart illustrating an example of file creation start processing.

FIG. 19 is a flowchart illustrating an example of the file creation start processing. This processing in FIG. 19 corresponds to the processing in step S101 in FIG. 18.

[Step S111] The file system processing unit 132 adds a record, which corresponds to the file requested to be written, in the directory table 111.

[Step S112] The file system processing unit 132 adds a record, which corresponds to the file requested to be written, in the entry table 112. For example, information is registered in the items "ino" and "size" in the added record.

[Step S113] The file system processing unit 132 adds a file operation log, which corresponds to the file requested to be written, in the operation log table 121. In the added file operation log, "file being created" is stored in the item "action", and "1" is stored as the value of the update counter in the item "update".

Figure 20:
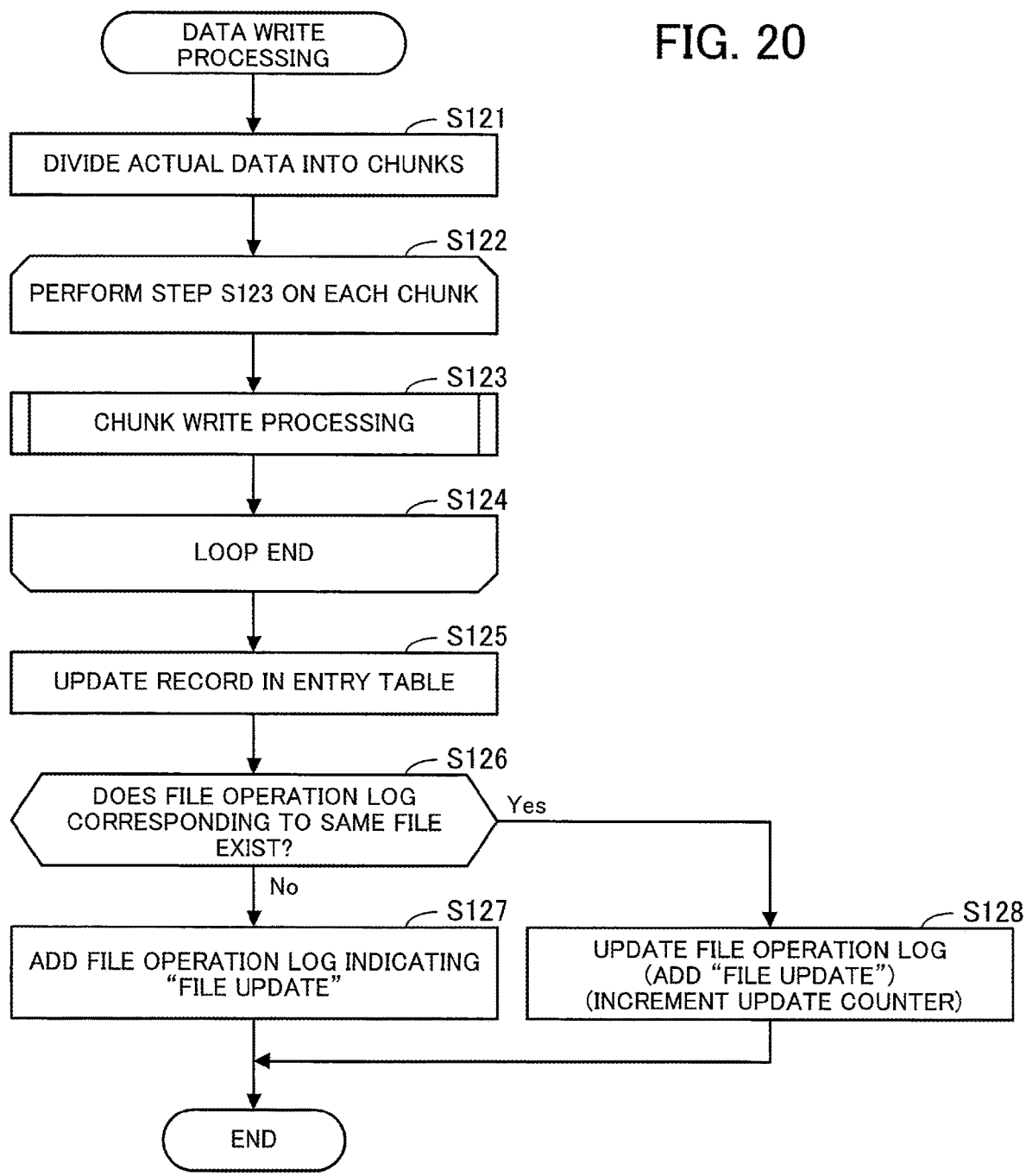
FIG. 20 is a flowchart illustrating an example of data write processing.

FIG. 20 is a flowchart illustrating an example of the data write processing. This processing in FIG. 20 corresponds to the processing in step S102 in FIG. 18.

[Step S121] The file system processing unit 132 divides the actual data in the file received from the NAS client 210 into chunks.

[Step S122] The file system processing unit 132 performs the loop from step S122 to step S124 for each chunk generated by the division.

[Step S123] The file system processing unit 132 performs chunk write processing on the processing target chunk.

[Step S124] After performing the processing in step S123 on all the chunks, the file system processing unit 132 performs processing in step S125.

[Step S125] The file system processing unit 132 updates the record, which has been registered in the entry table 112 and corresponds to the file requested to be written. In this processing, for example, information is registered in the items "mode", "nlink", "uid", "gid", "atime", "mtime", and "ctime".

[Step S126] The file system processing unit 132 refers to the operation log table 121 and determines whether a file operation log corresponding to the file requested to be written exists. If the file system processing unit 132 finds the corresponding file operation log, the file system processing unit 132 performs processing in step S128. If the file operation log does not exist, the file system processing unit 132 performs processing in step S127.

[Step S127] The file system processing unit 132 adds a file operation log corresponding to the file requested to be written in the operation log table 121. In the added file operation log, "file update" is stored in the item "action", and "1" is stored as the value of the update counter in the item "update".

[Step S128] The file system processing unit 132 updates the file operation log found in the operation log table 121. Specifically, "file update" is additionally stored in the item "action", and the value of the update counter stored in the item "update" is incremented.

Figure 21:
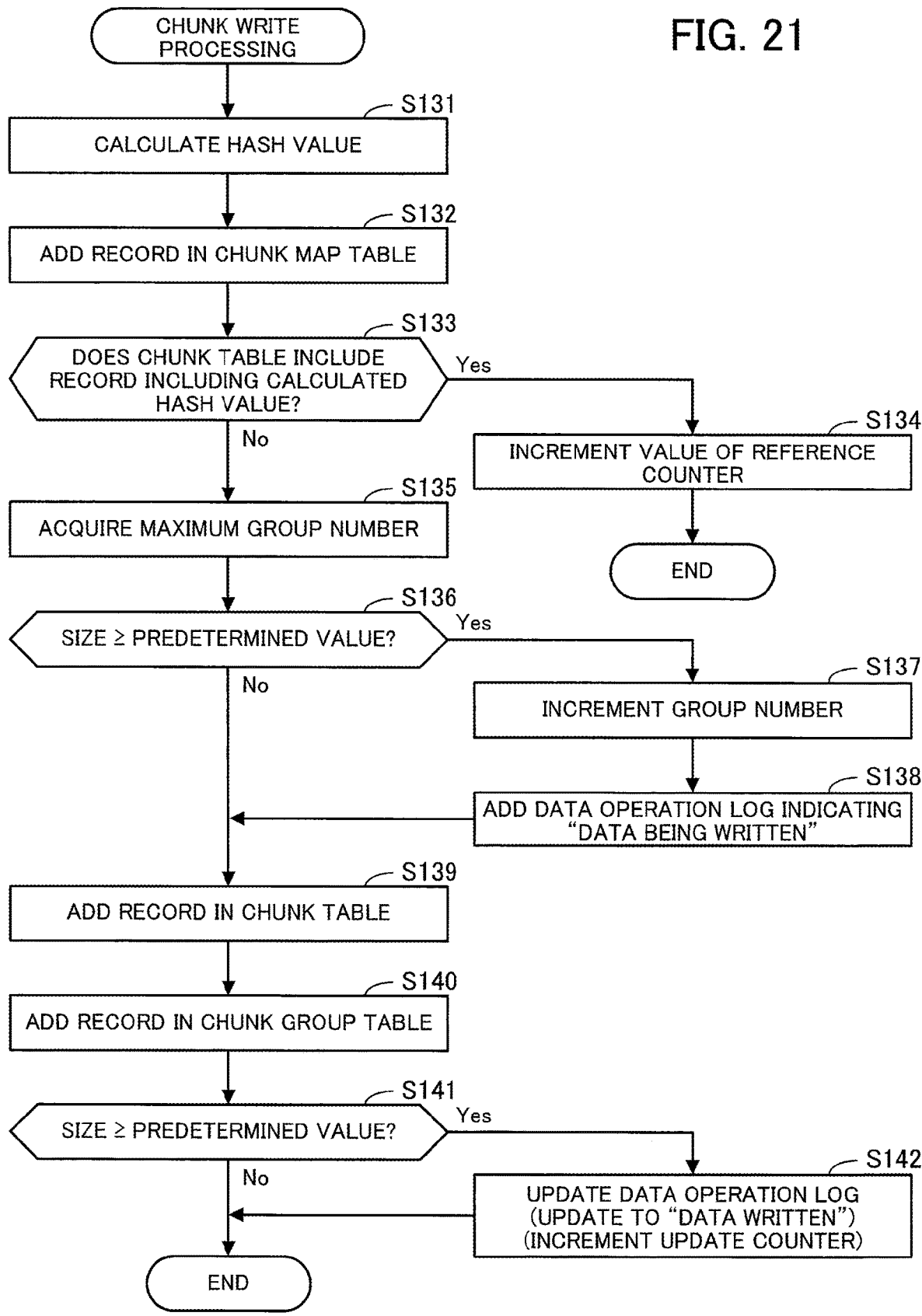
FIG. 21 is a flowchart illustrating an example of chunk write processing.

FIG. 21 is a flowchart illustrating an example of the chunk write processing. This processing in FIG. 21 corresponds to the processing in step S123 in FIG. 20.

[Step S131] The file system processing unit 132 calculates a hash value based on data of the processing target chunk.

[Step S132] The file system processing unit 132 adds a record corresponding to the processing target chunk in the chunk map table 113. In this step, information is registered in items "ino", "offset", and "size" in the added record.

[Step S133] The file system processing unit 132 refers to the chunk table 114 and determines whether there is a record including the hash value calculated in step S131 as the item "hash". If the file system processing unit 132 finds the record, the file system processing unit 132 performs processing in step S134. If the corresponding record does not exist, the file system processing unit 132 performs processing in step S135.

[Step S134] The file system processing unit 132 refers to the record found in the chunk table 114 in step S133 and increments the value of the reference counter stored in the item "refcnt". In addition, the file system processing unit 132 registers the information, which is registered in the items "gno" and "gindex" in the record found in the chunk table 114, in the items "gno" and "gindex" in the record added in the chunk map table 113 in step S132.

[Step S135] The file system processing unit 132 refers to the chunk group table 115 and acquires the group number registered in the last record (namely, the maximum group number at this point in time).

[Step S136] The file system processing unit 132 determines whether the total size of the chunk data included in the chunk group having the group number acquired in step S135 is equal to or more than a predetermined value. If the total size is equal to or more than the predetermined value, the file system processing unit 132 performs processing in step S137. If the total size is less than the predetermined value, the file system processing unit 132 performs processing in step S139.

[Step S137] The file system processing unit 132 generates a new group number by incrementing the group number acquired in step S135.

[Step S138] The file system processing unit 132 adds a data operation log in the operation log table 121.

In this step, the group number generated in step S137 is stored in the item "gno" in the added data operation log, "data being written" is stored in the item "action", and "1" is stored as the value of the update counter in the item "update".

[Step S139] The file system processing unit 132 adds a record in the chunk table 114. In this step, the hash value calculated in step S131 is stored in the item "hash", the corresponding chunk size is stored in the item "size", and "1" is stored as the value of the reference counter in the item "refcnt" in the added record. In addition, if "Yes" is determined in step S136, the group number generated in step S137 is stored in the item "gno", and an index number indicating the initial chunk is stored in the item "gindex". In contrast, if "No" is determined in step S136, the group number acquired in step S135 is stored in the item "gno". In addition, an index number indicating the next order of the last chunk data included in the chunk group corresponding to this group number is stored in the item "gindex".

[Step S140] The file system processing unit 132 adds a record in the chunk group table 115. In this step, the same information as that stored in the items "gno" and "gindex" in step S139 is stored in the items "gno" and "gindex", and the chunk data compressed is stored in the item "data" in the record added in the chunk group table 115.

[Step S141] The file system processing unit 132 determines whether the total size of the chunk data included in the chunk group corresponding to the group number stored in the record in step S139 is equal to or more than a predetermined value. If the total size is equal to or more than the predetermined value, the file system processing unit 132 performs processing in step S142. If the total size is less than the predetermined value, the file system processing unit 132 ends the chunk write processing.

[Step S142] In this case, the operation log table 121 includes the data operation log holding the group number, which has been stored in the records in steps S139 and S140, and holding "data being written" in the item "action". Regarding this data operation log, the file system processing unit 132 overwrites "data being written" with "data written" in the item "action" and increments the value of the update counter stored in the item "update".

Figure 22:
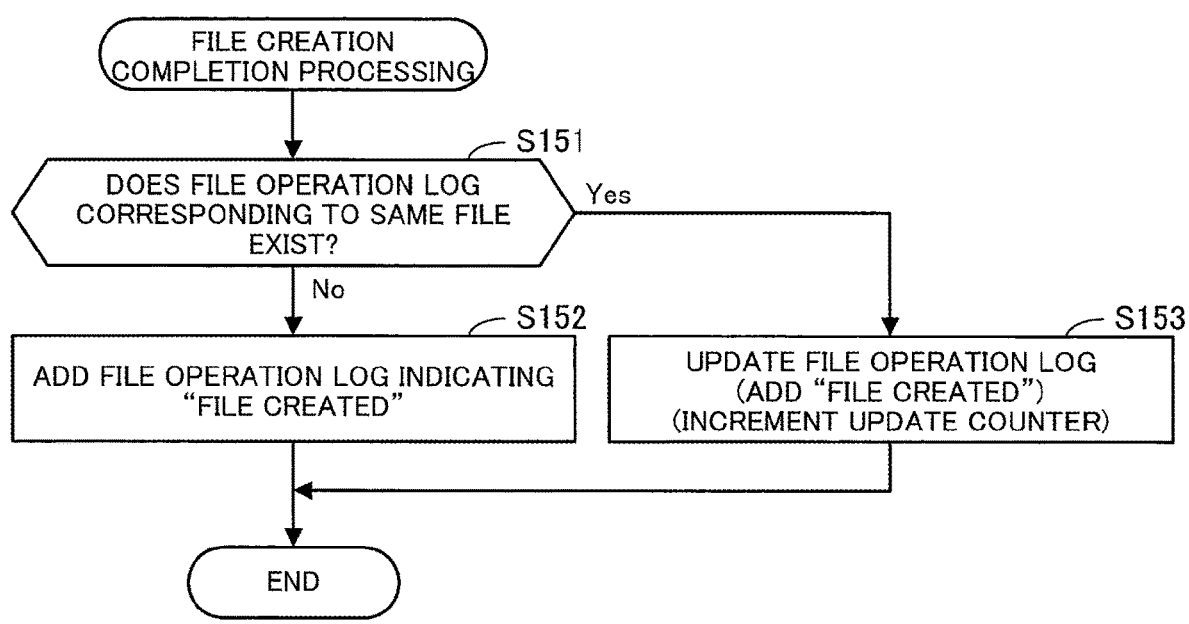
FIG. 22 is a flowchart illustrating an example of file creation completion processing.

FIG. 22 is a flowchart illustrating an example of the file creation completion processing. The processing in FIG. 22 corresponds to the processing in step S103 in FIG. 18.

[Step S151] The file system processing unit 132 refers to the operation log table 121 and determines whether a file operation log corresponding to the file requested to be written exists. If the file system processing unit 132 has found the corresponding file operation log, the file system processing unit 132 performs processing in step S153. If the corresponding file operation log does not exist, the file system processing unit 132 performs processing in step S152.

[Step S152] The file system processing unit 132 adds a file operation log corresponding to the file requested to be written in the operation log table 121. In this step, in the added file operation log, "file created" is stored in the item "action", and "1" is stored as the value of the update counter in the item "update".

[Step S153] The file system processing unit 132 updates the file operation log found in the operation log table 121. Specifically, "file created" is additionally stored in the item "action", and the stored value of the update counter is incremented in the item "update".

Next, processing performed when updating of an existing file is requested by the NAS client 210 will be described. When updating of a file is request, the file system processing unit 132 basically performs the three steps as in the step S101 to S103 illustrated in FIG. 18. Hereinafter, the difference from the processing performed in the case in which a new file is requested to be written will be described per step.

First, in the processing in the first step corresponding to step S101, the following processing is performed. The file system processing unit 132 updates a record, which is registered in the entry table 112 and corresponds to the file requested to be updated. In this update, the value stored in the item "size" is updated to the value of the size of the updated file.

Next, the file system processing unit 132 refers to the operation log table 121 and determines whether a file operation log corresponding to the file requested to be updated exists. When the file operation log exists, the file system processing unit 132 stores "file being created" in the item "action" in the file operation log and increments the value stored in the item "update". In contrast, if the file operation log does not exist, the file system processing unit 132 adds a file operation log corresponding to the file requested to be written in the operation log table 121. In the added file operation log, "file being created" is stored in the item "action", and "1" is stored as the value of the update counter in the item "update".

Figure 23:
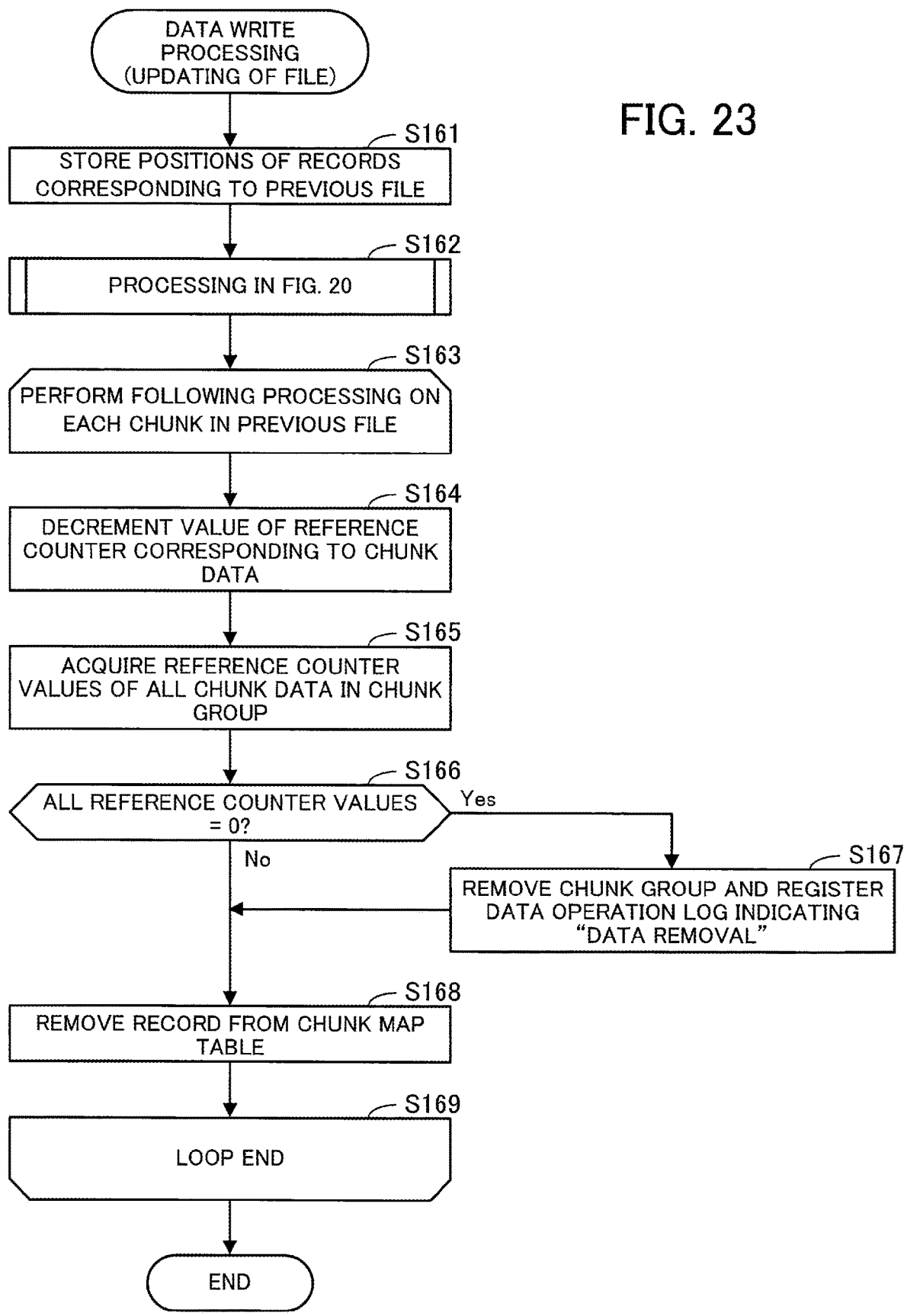
FIG. 23 is a flowchart illustrating an example of data write processing performed when a file is requested to be updated.

Next, in the processing in the second step corresponding to step S102, data write processing as illustrated in the next FIG. 23 is performed.

FIG. 23 is a flowchart illustrating an example of data write processing performed when a file is requested to be updated.

[Step S161] The file system processing unit 132 stores the positions of the records, which are registered in the chunk map table 113 and correspond to the file not updated (previous file), in the RAM 102.

[Step S162] The file system processing unit 132 performs the processing in FIG. 20 on the actual data of the updated file received from the NAS client 210. As a result, the actual data of the updated file is divided into chunks, and information about each chunk is registered in the chunk map table 113, the chunk table 114, and the chunk group table 115.

[Step S163] The file system processing unit 132 performs the processing from steps S164 to S168 on each chunk in the previous file, based on the contents of the records indicated by the positions stored in step S161.

[Step S164] The file system processing unit 132 refers to a record in which chunk data corresponding to the processing target chunk is stored, the record being registered in the chunk table 114, and decrements the value of the reference counter stored in the item "refcnt".

[Step S165] The file system processing unit 132 acquires the group number (gno) from the record referred to in step S164. The file system processing unit 132 acquires the reference counter values of all the chunk data belonging to the chunk group indicated by the group number from the chunk table 114.

[Step S166] If all the reference counter values acquired in step S165 are "0", the file system processing unit 132 performs processing in step S167. If at least one of the values is "1" or more, the file system processing unit 132 performs processing in step S168.

[Step S167] In this case, all the chunk data included in the chunk group indicated by the group number acquired in step S165 is in an invalid state. Namely, none of the chunk data is referred to by any chunk. Thus, the file system processing unit 132 removes the records corresponding to this chunk group from the chunk group table 115. Consequently, the chunk group is removed.

In addition, the file system processing unit 132 registers a data operation log for removing the information about this chunk group from the cloud storage 240 in the operation log table 121. Namely, in this data operation log, "data removal" is stored in the item "action", and "1" is stored as the update counter value in the "update" item. When a data operation log corresponding to the corresponding chunk group is already registered, the file system processing unit 132 overwrites the information in the item "action" in the data operation log with "data removal" and increments the value stored in the item "update".

[Step S168] The file system processing unit 132 removes the record indicated by a position stored in step S161 from the chunk map table 113.

If "No" is determined in step S166 and if the reference counter value indicates "0" after decremented in step S164, the file system processing unit 132 may remove the record including this reference counter from the chunk table 114. If "Yes" is determined in step S166, the file system processing unit 132 may remove the records corresponding to all the chunk data belonging to the chunk group removed in step S167 from the chunk table 114.

[Step S169] When the file system processing unit 132 completes the processing from steps S164 to S168 on all the chunks in the previous file, the file system processing unit 132 ends the data write processing.

Finally, in the processing in the third step corresponding to step S103, the file system processing unit 132 performs the processing as illustrated in FIG. 22 on the file operation log corresponding to the file requested to be updated.

In accordance with the above procedure, the processing of the file system processing unit 132 performed when update of an existing file is requested by the NAS client 210 is completed.

The following processing is performed when removal of a file is requested by the NAS client 210. The file system processing unit 132 performs the processing from steps S164 to S168 in FIG. 23 on each chunk included in the removal target file. Consequently, the reference counter values corresponding to the chunk data associated with the removal target file are updated. If the reference counters of all the chunk data of a chunk group indicate "0", a data operation log for removing the information group about this chunk group from the cloud storage 240 is registered in the operation log table 121.

Next, the file system processing unit 132 removes the records corresponding to the removal target file from the directory table 111 and the entry table 112. In addition, the file system processing unit 132 performs the following processing for registering a file operation log.

In this registration processing, if a file operation log corresponding to the removal target file does not exist in the operation log table 121, the file system processing unit 132 registers a file operation log specifying the inode number of the removal target file in the operation log table 121. In this file operation log, "file removal" is stored in the item "action", and "1" is stored in the item "update". In contrast, if a file operation log corresponding to the removal target file exists in the operation log table 121, the file system processing unit 132 overwrites the information in the item "action" in this file operation log with "file removal", and increments the value in the item "update". Through this registration processing, a file operation log for removing the information group about the removal target file from the cloud storage 240 is registered in the operation log table 121.

Figure 24:
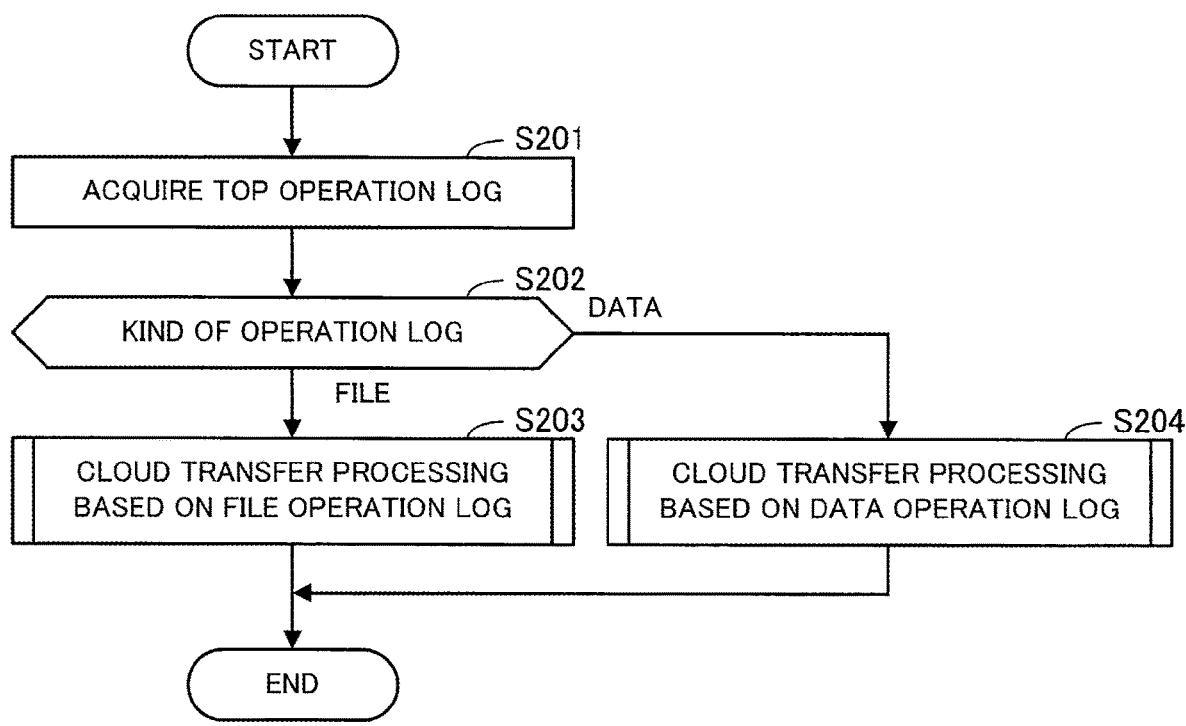
FIG. 24 is a flowchart illustrating an example of processing performed by a cloud transfer processing unit.

Next, processing performed by the cloud transfer processing unit 133 will be described. FIG. 24 is a flowchart illustrating an example of processing performed by the cloud transfer processing unit.

[Step S201] the cloud transfer processing unit 133 acquires the top operation log from the operation log table 121 (namely, a record having the smallest value in the item "counter").

[Step S202] The cloud transfer processing unit 133 determines the kind of the operation log based on the item "type" in the acquired operation log. If the acquired operation log is a file operation log, the cloud transfer processing unit 133 performs processing in step S203. If the acquired operation log is a data operation log, the cloud transfer processing unit 133 performs processing in step S204.

[Step S203] The cloud transfer processing unit 133 performs cloud transfer processing based on the file operation log.

[Step S204] The cloud transfer processing unit 133 performs cloud transfer processing based on the data operation log.

Figure 25:
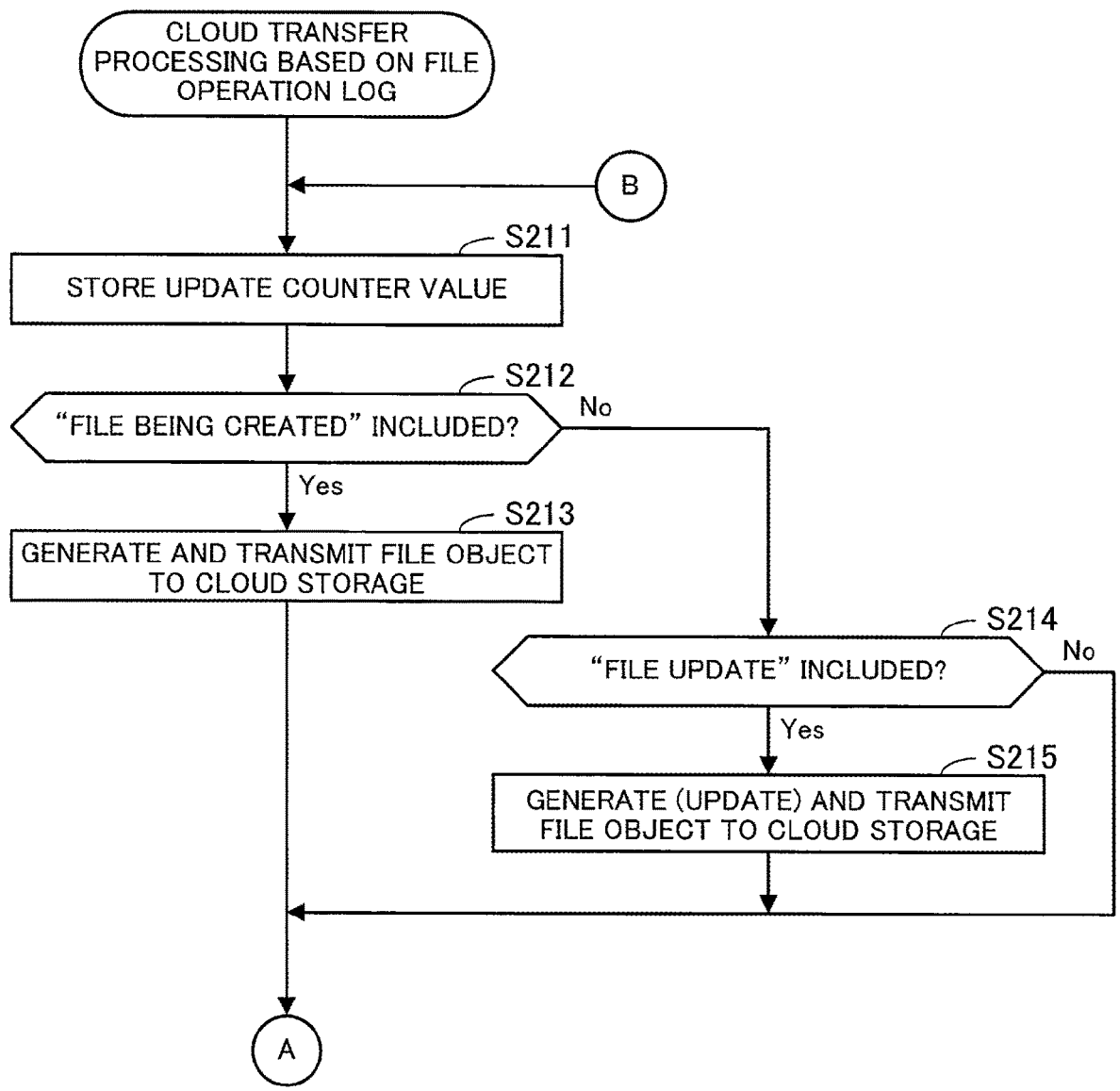
FIG. 25 is a flowchart illustrating an example of the first half of cloud transfer processing based on a file operation log.
Figure 26:
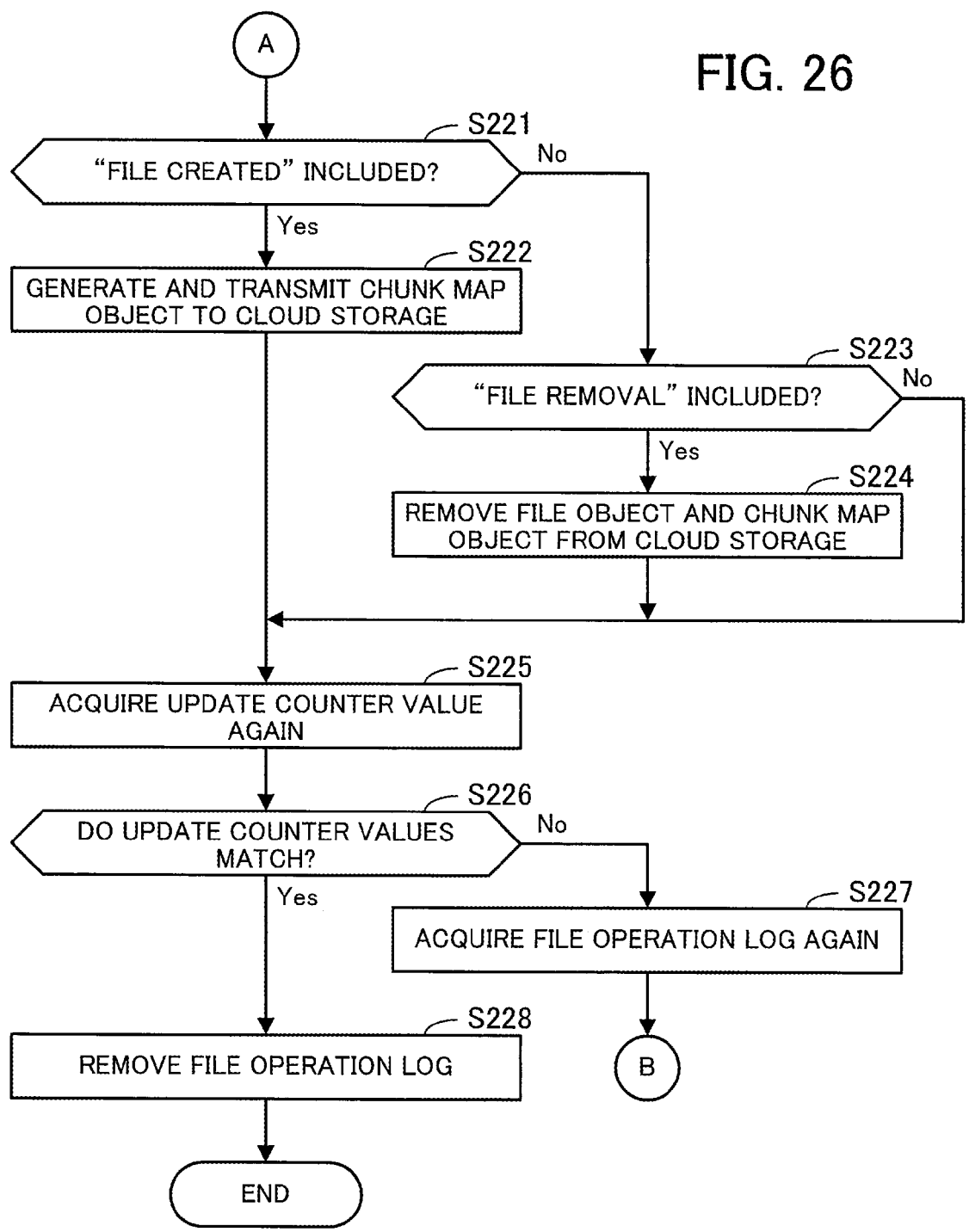
FIG. 26 is a flowchart illustrating an example of the second half of the cloud transfer processing based on a file operation log.

FIGS. 25 and 26 are a flowchart illustrating an example of the cloud transfer processing based on the file operation log. The processing in FIGS. 25 and 26 corresponds to the processing in step S203 in FIG. 24.

[Step S211] The cloud transfer processing unit 133 extracts the update counter value stored in the item "update" from the file operation log and stores the value in the count value storage unit 133*a*. If step S211 is performed after step S202 in FIG. 24, the file operation log from which this value is to be extracted is the file operation log acquired in step S202 in FIG. 24. If step S211 is performed after step S227 in FIG. 26, the file operation log from which this value is to be extracted is the file operation log acquired again in step S227.

[Step S212] If "file being created" is included in the item "action" in the acquired operation log, the cloud transfer processing unit 133 performs processing in step S213. If not, the cloud transfer processing unit 133 performs processing in step S214.

[Step S213] The cloud transfer processing unit 133 generates a file object in which "parent" and "name" of the file corresponding to the acquired file operation log are used as the object names. In this case, in the items as the object values of the file object, information is copied from the records, which are registered in the directory table 111 and the entry table 112 and correspond to the above file. The cloud transfer processing unit 133 transmits the generated file object to the cloud storage 240.

[Step S214] If "file update" is included in the item "action" in the acquired operation log, the cloud transfer processing unit 133 performs processing in step S215. If "file update" is not included, the cloud transfer processing unit 133 performs processing in step S221 in FIG. 26.

[Step S215] The cloud transfer processing unit 133 generates a file object in which "parent" and "name" of the file corresponding to the acquired file operation log are used as the object names. In this case, in the items as the object values of the file object, information is copied from the records, which are registered in the directory table 111 and the entry table 112 and correspond to the above file.

The cloud transfer processing unit 133 transmits the generated file object to the cloud storage 240. In this case, update of a file object corresponding to the same file is requested on the cloud storage 240.

The following description will be made with reference to FIG. 26.

[Step S221] If "file created" is included in the item "action" in the acquired operation log, the cloud transfer processing unit 133 performs processing in step S222. If "file created" is not included, the cloud transfer processing unit 133 performs processing in step S223.

[Step S222] The cloud transfer processing unit 133 generates a chunk map object in which the inode number of the file corresponding to the acquired file operation log is used as the object name. In this case, in the items as the object values in the chunk map object, information is copied from the records, which are registered in the chunk map table 113 and the chunk table 114 and correspond to the above file. The cloud transfer processing unit 133 transmits the generated chunk map object to the cloud storage 240.

For example, if "file being created" or "file update" is stored along with "file created" in the item "Action" when step S222 is performed, the file object is transmitted to the cloud storage 240 in the previous step S213 or step S215 based on "file being created" or "file update". As described above, by storing "file created" without overwriting the operation content "file being created" or "file update", the cloud transfer processing unit 133 is able to transfer the information needed based on the operation content "file being created" or "file update" from the data management unit 110 to the cloud storage 240 without fail.

[Step S223] If "file removal" is included in the item "action" in the acquired operation log, the cloud transfer processing unit 133 performs processing in step S224. If "file removal" is not included, the cloud transfer processing unit 133 performs processing in step S225.

[Step S224] The cloud transfer processing unit 133 generates a file object and a chunk map object in which the identification information of the file corresponding to the acquired file operation log is used as the object names. These file object and chunk map object are objects for requesting removal of the stored file object and chunk map object corresponding to the target file from the cloud storage 240. The cloud transfer processing unit 133 transmits the generated file object and chunk map object to the cloud storage 240.

[Step S225] The cloud transfer processing unit 133 refers to the operation log table 121 and acquires again the update counter value stored in the item "update" from the same file operation log used in step S202 in FIG. 24.

[Step S226] The cloud transfer processing unit 133 compares the update counter value stored in the count value storage unit 133a in step S211 with the update counter value acquired again in step S225. If these values are the same, the cloud transfer processing unit 133 performs processing in step S228. If these values are different from each other, the cloud transfer processing unit 133 performs processing in step S227.

[Step S227] The cloud transfer processing unit 133 acquires again the file operation log referred to in step S225 from the operation log table 121. Next, the cloud transfer processing unit 133 performs the processing in step S211 in FIG. 25 and continues the subsequent processing based on the file operation log acquired again. Namely, until the update counter values match in step S226, the cloud transfer processing unit 133 performs the processing in steps S227, S211 to S215, and S221 to S226.

[Step S228] The cloud transfer processing unit 133 removes the file operation log referred to in step S225 from the operation log table 121.

Figure 27:
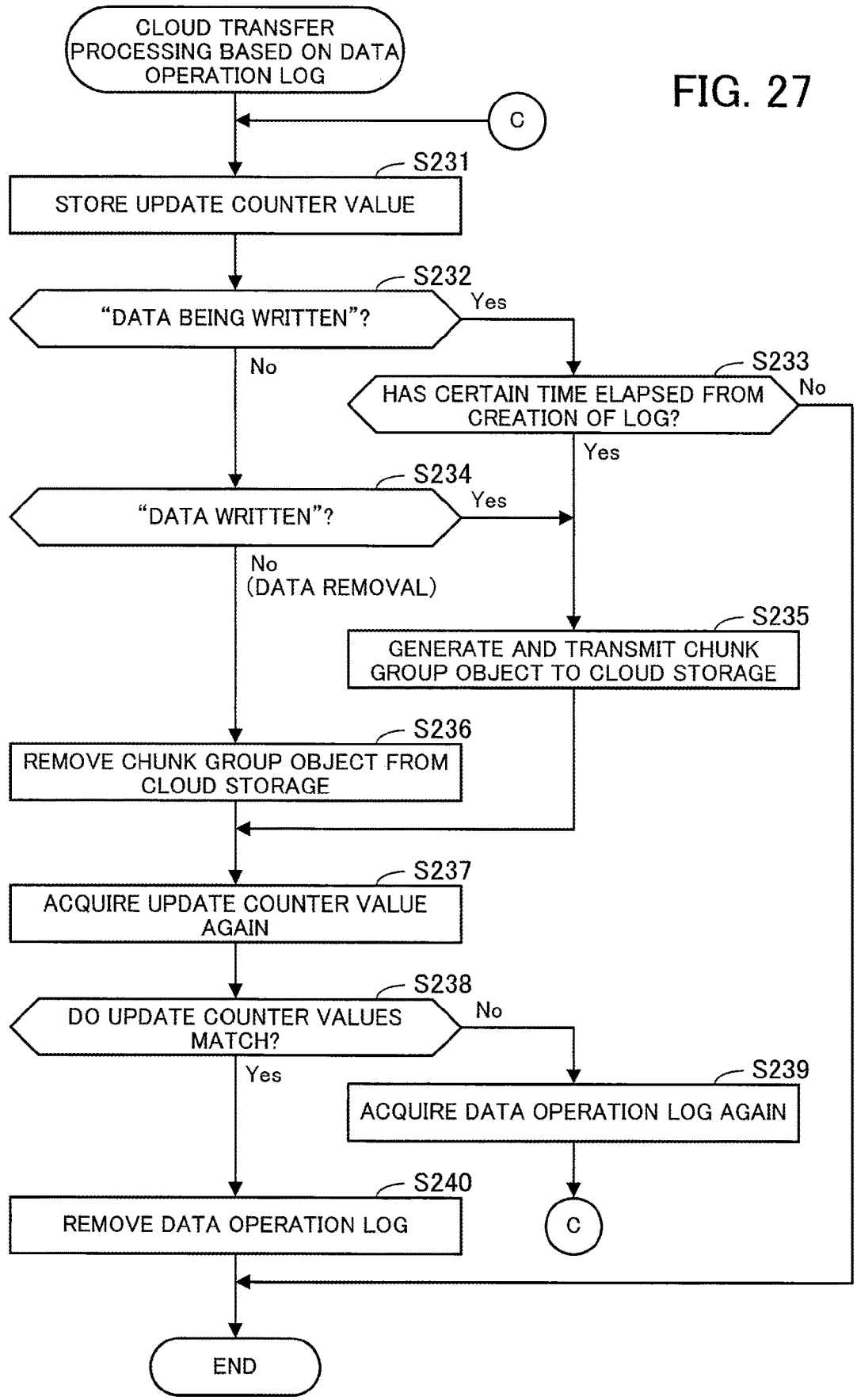
FIG. 27 is a flowchart illustrating an example of cloud transfer processing based on a data operation log.

FIG. 27 is a flowchart illustrating an example of cloud transfer processing based on a data operation log. The processing in FIG. 27 corresponds to the processing in step S204 in FIG. 24.

[Step S231] The cloud transfer processing unit 133 extracts the update counter value stored in the item "update" from the data operation log and stores the value in the count value storage unit 133a. If step S231 is performed after step S202 in FIG. 24, the data operation log from which this value is to be extracted is the data operation log acquired in step S202 in FIG. 24. If step S231 is performed after step S239 in FIG. 27, the data operation log from which this value is to be extracted is the data operation log acquired again in step S239.

[Step S232] If "data being written" is stored in the item "action" in the acquired data operation log, the cloud transfer processing unit 133 performs processing in step S233. If information other than "data being written" is recorded, the cloud transfer processing unit 133 performs processing in step S234.

[Step S233] The cloud transfer processing unit 133 determines whether a certain time has elapsed from the creation of the acquired data operation log. If the certain time has elapsed, the cloud transfer processing unit 133 performs processing in step S235. If the certain time has not elapsed yet, the cloud transfer processing unit 133 ends the processing.

[Step S234] If "data written" is stored in the item "action" in the acquired data operation log, the cloud transfer processing unit 133 performs processing in step S235. In contrast, if "data removal" is stored in the item "action", the cloud transfer processing unit 133 performs processing in step S236.

[Step S235] The cloud transfer processing unit 133 generates a chunk group object having the group number stored in the acquired data operation log as the object name. In this step, the cloud transfer processing unit 133 acquires the chunk data from the records in the chunk group table 115 that correspond to the above group number and stores the chunk data in the item "datalist" in the chunk group object. In addition, based on the chunk data, the cloud transfer processing unit 133 stores needed information in the item "header" in the chunk group object. The cloud transfer processing unit 133 transmits the generated chunk group object to the cloud storage 240.

[Step S236] The cloud transfer processing unit 133 generates a chunk group object having the group number stored in the acquired data operation log as the object name. This chunk group object is an object for requesting removal of the stored chunk group object corresponding to the group number from the cloud storage 240. The cloud transfer processing unit 133 transmits the generated chunk group object to the cloud storage 240.

[Step S237] The cloud transfer processing unit 133 refers to the operation log table 121 and acquires again the update counter value stored in the item "update" from the same data operation log used in step S202 in FIG. 24.

[Step S238] The cloud transfer processing unit 133 compares the update counter value stored in the count value storage unit 133a in step S231 with the update counter value acquired again in step S237. If these values are the same, the cloud transfer processing unit 133 performs processing in step S240. If these values are different from each other, the cloud transfer processing unit 133 performs processing in step S239.

[Step S239] The cloud transfer processing unit 133 acquires again the data operation log referred to in step S237 from the operation log table 121. Next, the cloud transfer processing unit 133 performs the processing in step S231 and continues the subsequent processing based on the data operation log acquired again. Namely, until the update counter values match in step S238, the cloud transfer processing unit 133 performs the processing in steps S239 and S231 to S238.

[Step S240] The cloud transfer processing unit 133 removes the data operation log referred to in step S237 from the operation log table 121.

The processing functions of each of the apparatuses (the information processing apparatus 1 and the cloud storage gateway 100) described in the above embodiments may be realized by a computer. In this case, a program in which the processing contents of the functions of an apparatus are written is provided, and this program is executed by a computer. As a result, the processing functions are realized on the computer. The program in which the processing contents are written may be stored in a computer-readable storage medium. Examples of the computer-readable storage medium include a magnetic storage device, an optical disc, a magneto-optical storage medium, and a semiconductor memory. Examples of the magnetic storage device include an HDD, a flexible disk (FD), and a magnetic tape. Examples of the optical disc include a compact disc (CD), a digital versatile disc (DVD), and a Blue-ray disc. Examples of the magneto-optical recording medium include a magneto optical disk (MO).

For example, one way to distribute the program is to sell portable storage media such as DVDs or CDs in which the program is stored. As another example, the program may be stored in a storage device of a server computer and forwarded to other computers from the server computer via a network.

For example, a computer that executes the program stores the program recorded in a portable storage medium or forwarded from the server computer in its storage device. Next, the computer reads the program from its storage device and executes processing in accordance with the program. The computer may directly read the program from the portable storage medium and perform processing in accordance with the program. Alternatively, each time a computer receives the program from the server computer connected thereto via the network, the computer may perform processing in accordance with the received program sequentially.

In one aspect, a data update content is reflected on a transfer destination without fail.

All examples and conditional language provided herein are intended for the pedagogical purposes of aiding the reader in understanding the invention and the concepts contributed by the inventor to further the art, and are not to be construed as limitations to such specifically recited examples and conditions, nor does the organization of such examples in the specification relate to a showing of the superiority and inferiority of the invention. Although one or more embodiments of the present invention have been described in detail, it should be understood that various changes, substitutions, and alterations could be made hereto without departing from the spirit and scope of the invention.

What is claimed is:

1. An information processing apparatus comprising:
a memory that holds a plurality of data groups each of which has been classified as a unit of data transfer to an external storage apparatus and transfer control information in which at least one item of operation information each corresponding to any one of the plurality of data groups is registered; and
a processor that executes a process including:
registering, when performing a first operation on a first data group of the plurality of data groups, first operation information corresponding to the first data group in the transfer control information,
temporarily storing, when extracting the first data group as a transfer target, the first operation information corresponding to the first data group as stored information and transferring the first data group to the external storage apparatus,
updating, when performing a second operation on the first data group while transferring the first data group to the external storage apparatus, the first operation information registered in the transfer control information,
comparing, when completing the transferring of the first data group to the external storage apparatus, the first operation information registered in the transfer control information with the stored information, and
retransferring, when the first operation information and the stored information do not match, the first data group corresponding to the first operation information to the external storage apparatus.

2. The information processing apparatus according to claim 1,
wherein the registering of the first operation information includes setting a predetermined count value in the first operation information,
wherein the updating of the first operation information includes updating the count value, and
wherein the comparing of the first operation information with the stored information includes comparing the count value included in the first operation information with the count value included in the stored information.

3. The information processing apparatus according to claim 1,
wherein the registering of the first operation information includes setting a first operation content indicating the first operation in the first operation information,
wherein the transferring of the first data group includes transferring data extracted from the first data group based on the first operation content set in the first operation information to the external storage apparatus,
wherein the updating of the first operation information includes setting a second operation content indicating the second operation in the first operation information, and
wherein the retransferring of the first data group includes transferring data extracted from the first data group based on the second operation content set in the first operation information to the external storage apparatus.

4. The information processing apparatus according to claim 3,
wherein the updating of the first operation information includes additionally setting the second operation content in the first operation information, and
wherein the retransferring of the first data group includes transferring, when the first operation content and the second operation content are set in the first operation information, the data extracted from the first data group based on the first operation content and the data extracted from the first data group based on the second operation content to the external storage apparatus.

5. The information processing apparatus according to claim 1,
wherein the retransferring of the first data group includes temporarily storing the first operation information registered in the transfer control information as the stored information, and
wherein the process further includes:
comparing, when completing the retransferring of the first data group, the first operation information registered in the transfer control information with the stored information; and
removing, when the first operation information and the stored information match, the first operation information from the transfer control information.

6. The information processing apparatus according to claim 1, wherein the operation information is acquired from the transfer control information in an order in which the operation information has been registered.

7. The information processing apparatus according to claim 1,
wherein each of the plurality of data groups is a group of management data about a file requested to be written in the external storage apparatus by an external information processing apparatus, and
wherein the first operation and the second operation are operations performed step by step on the management data group corresponding to a first file corresponding to the first data group between when writing of the first file is requested by the external information processing apparatus and when completion of the writing is notified to the external information processing apparatus.

8. The information processing apparatus according to claim 7,
wherein the process further includes:
dividing data of a file requested to be written by the external information processing apparatus into data segments;
allocating the data segments to area segments; and
storing the data segments included in the respective area segments in the memory after performing deduplication on the data segments,
wherein the management data group corresponding to the first data group includes: data indicating a correspondence relationship between the area segments generated by dividing the first file and storage locations in the memory of the data segments included in the respective area segments; and metadata of the first file, and wherein the first operation is a write operation of the metadata, and the second operation is a write operation of the data indicating the correspondence relationship.

9. The information processing apparatus according to claim 1, wherein the process further includes:

dividing data of a file requested to be written in the external storage apparatus by an external information processing apparatus into data segments;

allocating the data segments to area segments; and storing the data segments included in the respective area segments in the memory after performing deduplication on the data segments, and wherein the storing of the data segments includes storing a group of data segments generated by grouping at least one of the data segments in the memory as one data group included in the plurality of data groups.

10. A non-transitory computer-readable storage medium storing an information processing program that causes a computer to execute a process comprising:

registering, when performing a first operation on a first data group of a plurality of data groups stored in a memory, each of which has been classified as a unit of data transfer to an external storage apparatus, first operation information corresponding to the first data group in transfer control information in which at least one item of operation information each corresponding to any one of the plurality of data groups stored in a memory is registered;

temporarily storing, when extracting the first data group as a transfer target, the first operation information corresponding to the first data group as stored information and transferring the first data group to the external storage apparatus;

updating, when performing a second operation on the first data group while the first data group is being transferred to the external storage apparatus, the first operation information registered in the transfer control information;

comparing, when completing the transferring of the first data group to the external storage apparatus, the first operation information registered in the transfer control information with the stored information; and retransferring, when the first operation information and the stored information do not match, the first data group corresponding to the first operation information to the external storage apparatus.

11. The computer-readable storage medium according to claim 10, wherein the registering of the first operation information includes setting a predetermined count value in the first operation information, wherein the updating of the first operation information includes updating the count value, and wherein the comparing of the first operation information with the stored information includes comparing the count value included in the first operation information with the count value included in the stored information.

12. The computer-readable storage medium according to claim 10, wherein the registering of the first operation information includes setting a first operation content indicating the first operation in the first operation information, wherein the transferring of the first data group includes transferring data extracted from the first data group based on the first operation content set in the first operation information to the external storage apparatus, wherein the updating of the first operation information includes setting a second operation content indicating the second operation in the first operation information, and wherein the retransferring of the first data group includes transferring data extracted from the first data group based on the second operation content set in the first operation information to the external storage apparatus.

13. The computer-readable storage medium according to claim 10, wherein the retransferring of the first data group includes temporarily storing the first operation information registered in the transfer control information as the stored information, and wherein the process further includes:

comparing, when completing the retransferring of the first data group, the first operation information registered in the transfer control information with the stored information; and removing, when the first operation information and the stored information match, the first operation information from the transfer control information.

14. The computer-readable storage medium according to claim 10, wherein each of the plurality of data groups is a group of management data about a file requested to be written in the external storage apparatus by an external information processing apparatus, and wherein the first operation and the second operation are operations performed step by step on the management data group corresponding to a first file corresponding to the first data group between when writing of the first file is requested by the external information processing apparatus requests and when completion of the writing is notified to the external information processing apparatus.

15. The computer-readable storage medium according to claim 14, wherein the process further includes:

dividing data of a file requested to be written by the external information processing apparatus into data segments;

allocating the data segments to area segments; and storing the data segments included in the respective area segments in the memory after performing deduplication on the data segments, wherein the management data group corresponding to the first data group includes: data indicating a correspondence relationship between the area segments generated by dividing the first file and storage locations in the memory of the data segments included in the respective area segments; and metadata of the first file, and wherein the first operation is a write operation of the metadata, and the second operation is a write operation of the data indicating the correspondence relationship.

* * * * *